United States Patent
Okayama et al.

(10) Patent No.: US 6,188,589 B1
(45) Date of Patent: Feb. 13, 2001

(54) INVERTER

(75) Inventors: Hideo Okayama; Taichiro Tsuchiya; Hiroaki Yamaguchi, all of Tokyo (JP)

(73) Assignee: Mitsubishi Denki Kabushiki Kaisha, Tokyo (JP)

(*) Notice: Under 35 U.S.C. 154(b), the term of this patent shall be extended for 0 days.

(21) Appl. No.: 09/489,022

(22) Filed: Jan. 21, 2000

(30) Foreign Application Priority Data

Jan. 21, 1999 (JP) .................................. 11-012696

(51) Int. Cl.$^7$ .......................... H02H 7/122; H02H 3/335; H02H 7/521
(52) U.S. Cl. ................................ 363/58; 363/17; 363/136
(58) Field of Search ................................ 363/17, 27, 28, 363/55, 57, 58, 95, 96, 98, 135, 136

(56) References Cited

U.S. PATENT DOCUMENTS

| | | | |
|---|---|---|---|
| 4,853,836 | * 8/1989 | Furuhashi | 363/137 |
| 4,855,893 | * 8/1989 | Kratz | 363/136 |
| 5,155,674 | * 10/1992 | Tamoue et al. | 363/56 |
| 5,355,298 | * 10/1994 | Seki | 363/58 |
| 5,400,242 | * 3/1995 | Ando et al. | 363/136 |
| 5,768,114 | * 6/1998 | Gruning et al. | 363/58 |
| 5,982,646 | * 11/1999 | Lyons et al. | 363/58 |

FOREIGN PATENT DOCUMENTS 9182460   7/1997 (JP) .............................. H02M/7/515

OTHER PUBLICATIONS

Steimer et al., "IGCT—A New, Emerging Technology For High–Power, Low–Cost Inverters", ABB Review, May 1998, pp. 34–42.

* cited by examiner

*Primary Examiner*—Peter S. Wong
*Assistant Examiner*—Bao Q. Vu
(74) *Attorney, Agent, or Firm*—Leydig, Voit & Mayer, Ltd.

(57) ABSTRACT

An inverter having a large-capacity self-arc-extinguishing semiconductor element. Recovery capacitors recover energy stored in groups of elements for suppressing the rate of change in current, and are provided within a two-level or three-level inverter bridge. The thus-recovered energy is fed back to a d.c. voltage circuit by an energy regenerative circuit. The energy regenerative circuit controls the charging voltage of the recovery capacitors in proportion to the magnitude of a load current. In a case where the inverter includes inverter bridges connected to a single d.c. voltage circuit, the inverter bridges are divided into groups. A different energy regenerative circuit is connected to the inverter bridge on a per-group basis, and each of the energy regenerative circuits feeds power back to the d.c. voltage circuit.

19 Claims, 14 Drawing Sheets

INVERTER

BACKGROUND OF THE INVENTION

1. Field of the Invention

The present invention relates to a large-capacity inverter suitable for use with a self-extinguishing type semiconductor element, and more particularly, to an energy-loss reduction technique for reducing to as low as possible an energy loss within a large-capacity inverter.

2. Description of the Related Art

A large-capacity self-arc-extinguishing semiconductor element is currently employed in a large-capacity inverter. Examples of the self-arc-extinguishing semiconductor element include a gate-commutated turn-off thyristor (GCT) and an insulated gate bipolar transistor (IGBT) The GCT immediately transfers all conduction currents to a gate circuit and performs a turn-off operation at a turn-off gain of 1. The GCT is larger in capacity than the IGBT. Currently, the IGBT has a maximum rating of about 4.5 kV and about 1.5 kA. As of now, a GCT has a rating of 6.0 kV and 6.0 kA, as a result of application of a 6-inch silicon wafer to the GCT. Continued improvements in ratings of the IGBT and GCT are expected in the future.

FIG. 15 shows a conventional inverter to which the GCT is applied, particularly showing the configuration of a two-level inverter bridge. FIG. 15 is disclosed in Japanese Patent Unexamined Publication No. Hei. 9-182460. In FIG. 15, reference numeral 1 designates a d.c. voltage circuit (having voltage E) having potentials P and N; 2a and 2b designate GCTs acting as self-arc-extinguishing elements; 3a and 3b designate free-wheeling diodes; 4 designates an anode reactor; 5 designates a clamping diode; 6 designates a clamping capacitor; and 7 designates a discharge resistor. Symbol "OUT" designates an output terminal connected to a load. The rate of increase in critical voltage of the GCTs 2a and 2b is several times that of a conventional gate turn-off thyristor. Since the GCTs 2a and 2b have a wide safety operation range, the inverter does not require use of a charge-and-discharge snubber circuit, which would otherwise be required when gate turn-off thyristors are employed. For this reason, a voltage clamping circuit shown in FIG. 15 can be applied to the inverter.

For instance, during the period of turn-on operation of the GCT 2a, the energy induced by a reverse recovery current output from the free-wheeling diode 3b is stored in the anode reactor 4. Further, during the period of turn-off operation of the GCT 2a, the energy induced by a load current is stored in the anode reactor 4. After having been temporarily stored in the clamping capacitor 6, the thus-stored energy is dissipated by the discharge resistor 7. The maximum level of the reverse recovery current which develops in the free-wheeling diode 3b as a result of the turn-on operation of the GCT 2a greatly depends on the magnitude of the load current, the rate of change in the current determined on the basis of the magnitude E of the voltage of the d.c. voltage circuit 1 and the inductance of the anode reactor 4, or the virtual junction temperature of the free-wheeling diode 3b.

Next will be described an abrupt change in the voltage E of the d.c. voltage circuit 1 in the circuit shown in FIG. 15, particularly a rise in the voltage E of the d.c. voltage circuit 1. In the circuit shown in FIG. 15, the clamping capacitor 6 is recharged by way of the anode reactor 4 and the clamping diode 5, to thereby diminish a difference between the voltage of the d.c. voltage circuit 1 and the voltage of the clamping capacitor 6. The reason for this recharge is that a reverse voltage is not applied to the clamping diode 5 except when the GCTs 2a and 2b are in a transitory phase from one switching operation to another switching operation.

Incidentally, market demand exists for an increase in the capacity of an inverter. The rated capacity of the inverter shown in FIG. 15 may be increased by means of a three-level inverter. If the inverter shown in FIG. 15 is expanded to a three-level inverter bridge, the resultant circuit may assume a configuration such as that shown in FIG. 16. Such a configuration is not schematically shown in the above-described Japanese Patent Unexamined Publication No. Hei. 9-182460. Potential P and potential C are applied to the d.c. voltage circuit 1a, and potential C and potential N are applied to the d.c. voltage circuit 1b. A difference between potential P and potential C is indicated by E and is equal to a difference between potential C and potential N. Reference numerals 8a and 8b designate coupling diodes. In contrast with the voltage which can be output from the output terminal OUT of the circuit shown in FIG. 15, a voltage 2E can be output from the output terminal OUT of the circuit shown in FIG. 16. If GCTs of the same rated capacity are applied to the inverter shown in FIG. 15 and that shown in FIG. 16, a comparison between the inverters would show that the rated capacity of the inverter shown in FIG. 16 is twice that of the inverter shown in FIG. 15. Here, the inverter shown in FIG. 16 must have two anode reactors 4a and 4b.

In a case where the capacity of an inverter is increased in order to meet market demand, a load current or the voltage of the d.c. voltage circuit 1 must be increased, which in turn may increase the reverse recovery current output from the free-wheeling diode 3. Alternatively, in a case where a large-diameter diode is used as the free-wheeling diode 3, an increase in the area of the wafer causes an increase in the area of a junction. Accordingly, the reverse recovery current is increased further. The energy stored in the anode reactor 4 is proportional to the square of the current flowing through the anode reactor 4, and hence the power loss, which would be induced by the discharge resistor 7, is significantly increased, thus posing a problem of a decrease in the efficiency of the inverter.

Further, in the event that a gate signal for activating the GCT 2 becomes faulty and a short-circuit arises in the d.c. voltage circuit 1 due to faulty operations of the GCT 2, excessive short-circuit current flows to the main circuit of the inverter shown in FIG. 15. Such a short-circuit current may induce deformation of the anode reactor 4 or deformation or fracture of metal conductors used for interconnecting individual constituent components. Conceivable measures to eliminate such a possibility include increasing the size of the anode reactor 4 and connecting fuses in series. In a case where consideration is given to the surge current withstand of the GCT 2 and the pre-arcing time-current characteristic of a fuse, there arises a problem of a necessity for increasing the inductance of the anode reactor 4. If the inductance of the anode rector 4 is increased, the power loss caused by the discharge resistor 7 is increased to a much greater extent. Eventually, there arises a problem of an increase in the power loss of the inverter and deterioration of efficiency thereof.

In the case of an increase in the d.c. voltage circuit, the clamping capacitor 6 is inevitably recharged by way of the clamping diode 5 in the manner as mentioned above. If the GCT 2 commences a turn-on operation while the charging current is flowing through the clamping diode 5, a current which is characterized in involving an excessive rate of increase flows into the GCT 2 during a period from the time the clamping diode 5 commences a reverse recovery operation until the time the charging voltage applied to the clamping capacitor 6 is reversely applied to the clamping diode 5. This may induces a faulty turn-on operation of the GCT 2 or application of an excessive surge voltage to the clamping diode 5, which would result in breakage of the main circuit element.

In a case where the three-level inverter bridge shown in FIG. 6 is applied to the inverter in order to increase the capacity thereof, the number of anode reactors 4 is increased. Consequently, the power loss induced by the inverter is increased, thereby rendering a cooling device bulky.

SUMMARY OF THE INVENTION

The present invention has been made to solve such a problem of the related art and is aimed at providing an inverter which can simultaneously achieve an increase in capacity, a decrease in power loss, an increase in reliability, and miniaturization, through use of a large-capacity self-arc-extinguishing semiconductor element.

To achieve the above object, according to a first aspect of the present invention, there is provided an inverter comprising: a d.c. voltage circuit imparted with two potentials P and N; "n" two-level inverter bridges (where "n" is an integer satisfying n≧1) which can selectively output the potential P or N to an output terminal connected to a load, each of the "n" two-level inverter bridges including: first and second self-arc-extinguishing semiconductor elements which are connected in series, first and second free-wheeling diodes connected in reverse orientation and in parallel with the first and second self-arc-extinguishing semiconductor elements, a group of elements for suppressing the rate of change in current which are connected to a junction between the potential P of the d.c. voltage circuit and the anode terminal of the first self-arc-extinguishing semiconductor element, a first serially-connected element which is connected to a node between the anode terminal of the first self-arc-extinguishing semiconductor element and the cathode terminal of the second self-arc-extinguishing semiconductor element and which includes a clamping diode and a clamping capacitor, and a second serially-connected element including a recovery diode and a recovery capacitor for recovering energy from the clamping capacitor and from the group of elements for suppressing the rate of change in current, the cathode terminal of the clamping diode and the anode terminal of the recovery diode being connected to one of the two terminals of the clamping capacitor which is not connected to the cathode terminal of the second self-arc-extinguishing semiconductor element; and an energy regenerative circuit which is connected to the recovery capacitor and feeds the energy stored in the recovery capacitor back to the d.c. voltage circuit.

According to a second aspect of the present invention, there is provided an inverter comprising: a d.c. voltage circuit imparted with three potentials P, C, and N; "n" three-level inverter bridges (where "n" is an integer satisfying n≧1) which can selectively output any one of the potentials P, C, and N to an output terminal connected to a load, each of the "n" three-level inverter bridges including: first through fourth self-arc-extinguishing semiconductor elements which are connected in series, first through fourth free-wheeling diodes connected in reverse orientation and in parallel with the first through fourth self-arc-extinguishing semiconductor elements, a first coupling diode connected to a node between the potential C of the d.c. voltage circuit and the anode terminal of the second self-arc-extinguishing semiconductor element, a second coupling diode connected to a node between the cathode terminal of the third self-arc-extinguishing semiconductor element and the potential C of the d.c. voltage circuit, a first group of elements for suppressing the rate of change in current which are connected to a junction between the potential P of the d.c. voltage circuit and the anode terminal of the first self-arc-extinguishing semiconductor element, a second group of elements for suppressing the rate of change in current which are connected to a junction between the potential N of the d.c. voltage circuit and the cathode terminal of the fourth self-arc-extinguishing semiconductor element, a first serially-connected element which is connected to a node between the anode terminal of the first self-arc-extinguishing semiconductor element and the potential C of the d.c. voltage circuit and includes a first clamping diode and a first clamping capacitor, a second serially-connected element which is connected to a node between the potential C of the d.c. voltage circuit and the cathode terminal of the fourth self-arc-extinguishing semiconductor element and includes a second clamping capacitor and a second clamping diode, a third serially-connected element including a first recovery diode and a first recovery capacitor for recovering energy from the first clamping capacitor and from the first group of elements for suppressing the rate of change in current, and a fourth serially-connected element including a second recovery diode and a second recovery capacitor for recovering energy from the second clamping capacitor and from the second group of elements for suppressing the rate of change in current, the cathode terminal of the first clamping diode and the anode terminal of the first recovery diode being connected to one of the two terminals of the first clamping capacitor which is not connected to the potential C of the d.c. voltage circuit, and the anode terminal of the second clamping diode and the cathode terminal of the second recovery diode being connected to one of the two terminals of the second clamping capacitor which is not connected to the potential C of the d.c. voltage circuit; a first energy regenerative circuit which is connected to the first recovery capacitor and feeds the energy stored in the first recovery capacitor back to a node between the potential P and the potential C of the d.c. voltage circuit; and a second energy regenerative circuit which is connected to the second recovery capacitor and feeds the energy stored in the second recovery capacitor back to a node between the potential C and the potential N of the d.c. voltage circuit.

DETAILED DESCRIPTION OF THE PREFERRED EMBODIMENTS

Inverters embodying the present invention will be described hereinbelow with reference to the drawings.

First Embodiment

Figure 1:
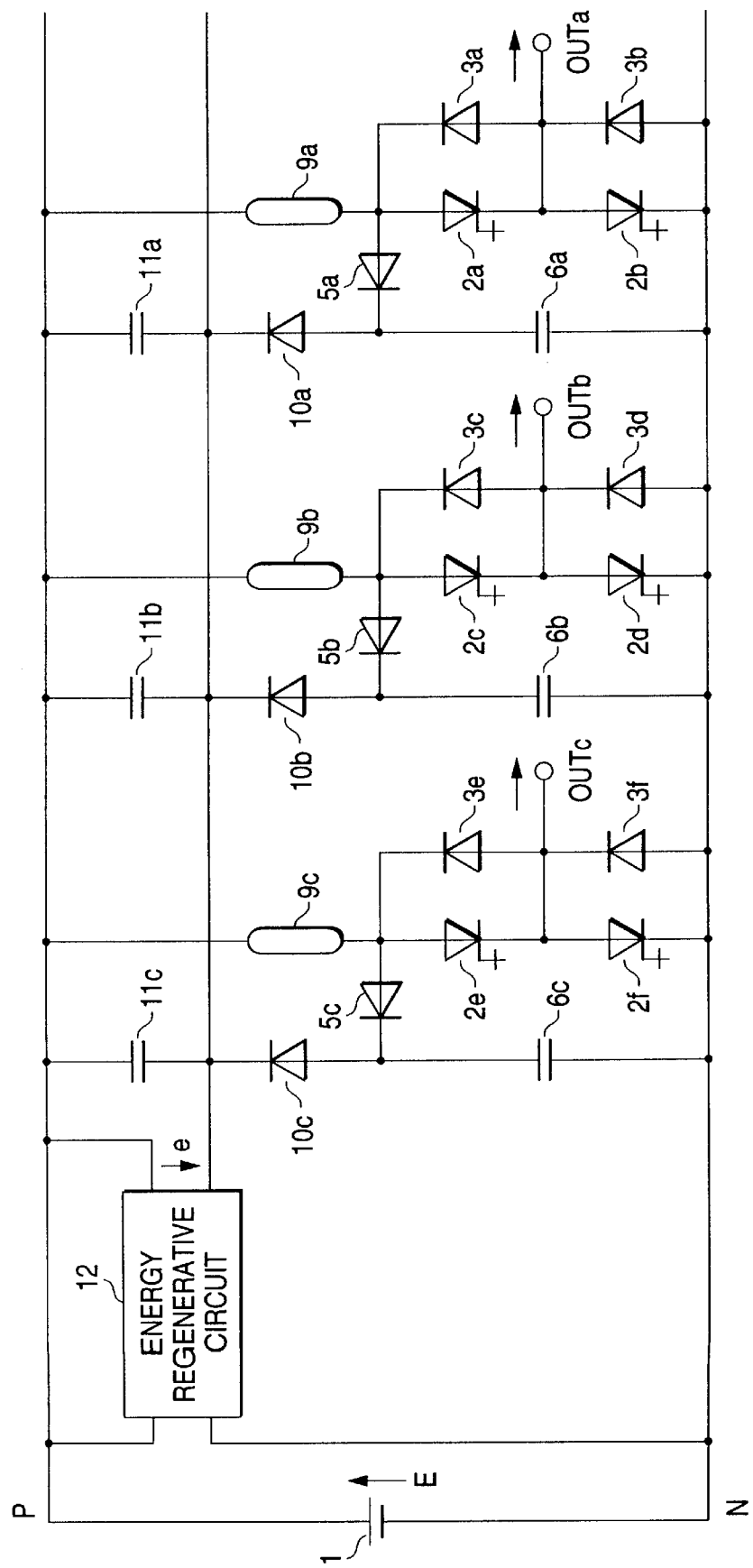
FIG. 1 is a diagram showing the circuit configuration of an inverter according to a first embodiment of the present invention.

FIG. 1 is a circuit diagram of an inverter according to a first embodiment of the present invention, showing a two-level inverter bridge. Although FIG. 1 shows an inverter of three-phase configuration, the first embodiment is not particularly limited to the inverter of three-phase configuration.

First will be described the circuit configuration of the inverter shown in FIG. 1. Reference numeral 1 designates a d.c. voltage circuit imparted with potential P and potential N (corresponding to voltage E); and 2a to 2f designate GCTs acting as self-arc-extinguishing semiconductor elements, wherein 2a, 2c, and 2e designate first GCTs and 2b, 2d, and 2f designate second GCTs. Reference numerals 3a to 3f designate free-wheeling diodes connected in reverse orientation and in parallel with the respective GCTs 2a to 2f, wherein 3a, 3c, and 3e designate first free-wheeling diodes and 3b, 3d, and 3f designate second free-wheeling diodes. Reference numerals 5a to 5c designate clamping diodes, and 6a to 6c designate clamping capacitors. A first serially-connected element is constituted of the clamping diodes 5a to 5c and the clamping capacitors 6a to 6c. Reference numerals 9a to 9c designate groups of elements for suppressing the rate of change in electric current (hereinafter referred to simply as "suppression groups"); 10a to 10c designate recovery diodes for recovering the energy stored in the respective clamping capacitors 6a to 6c and the respective suppression groups 9a to 9c; and 11a to 11c designate recovery capacitors. A second serially-connected element is constituted of the recovery diodes 10a to 10c and the recovery capacitors 11a to 11c. Reference numeral 12 designates an energy regenerative circuit for feeding back, to the d.c. voltage circuit 1, the energy to be stored in the recovery capacitors 11a to 11c. OUTa to OUTc are output terminals to be connected to unillustrated loads.

Next will be described the circuit operation of the inverter. It is assumed that a charging voltage to be applied to the recovery capacitors 11a to 11c is controlled by the energy regenerative circuit 12 so as to be a voltage "e" which has a polarity as illustrated and is substantially constant. A load current flowing from the output terminal OUT to a load, as designated by an arrow, is taken to be of positive polarity.

The switching operations of the GCTs 2a and 2b to be performed when the load current is of positive polarity will now be described. Further, it is assumed that the inverter is subjected to pulse width modulation (PWM) control. Provided that the cycle of PWM is taken as $T_s$, in response to an output voltage instruction the GCTs 2a and 2b perform switching operations such as those shown in FIG. 2. In the drawing, $T_d$ designates a short-circuit prevention time for preventing a short-circuit, which would otherwise be caused when the GCT 2a and the GCT 2b are simultaneously turned on in a transitory phase from one switching operation to another switching operation. The GCT 2a is initially set to an ON state, and the GCT 2b is initially set to an OFF state.

In this case, the load current flows through a path comprising the d.c. voltage circuit 1, the suppression group 9a, the GCT 2a, and the output terminal OUTa, in this sequence.

When the GCT 2a is turned off at $t=T_1$, the current that has been shut off by the GCT 2a flows through a bypass comprising the d.c. voltage circuit 1, the suppression group 9a, the clamping diode 5a, the clamping capacitor 6a, the free-wheeling diode 3b, and the output terminal OUTa, in this sequence. Provided that a stray inductance of a path extending from the anode terminal of the GCT 2a to the cathode terminal of the free-wheeling diode 3b is taken as $L_1$, the rate of increase in the voltage applied to the GCT 2a when the GCT 2a is turned off is taken as dv/dt, and the level of the load current is taken as I, a time T5 required for the current of the free-wheeling diode 3b to reach the level I of the load current can approximately be determined by the following equation.

$$T_5 = \sqrt{\frac{2L_1 \cdot I}{\left(\frac{dv}{dt}\right)}}$$

Preferably, $T_d$ is set to be greater than $T_5$. Since $T_5$ is a very short period of time, the current flowing through the suppression group 9a is still of the level I of the load current immediately after the conduction current of the free-wheeling diode 3b has reached the load current. The residual energy in the suppression group 9a is recovered by the recovery capacitor 11a by way of a path comprising the suppression group 9a, the clamping diode 5a, the recovery diode 10a, the recovery capacitor 11a, and the suppression group 9a, in this sequence.

After completion of the recovery operation, the charging voltage of the clamping capacitor 6a becomes E+e, and the reverse voltage to be applied to the clamping diode 5a becomes "e". Accordingly, even if the voltage of the d.c. voltage circuit 1 is changed within the range of 0 to "e", the reverse voltage is continually applied to the clamping diode 5a, thereby reserving the OFF state of the GCT 2a. In other words, the GCT 2a can be released from the state in which the GCT 2a is subjected to the load of an excessive rate of increase, which would otherwise be caused in the device of the related art. In the case of the inverter of multi-phase configuration such as that shown in FIG. 1, a variation in the d.c. voltage circuit 1 becomes more noticeable by the influence of switching operation of a two-level inverter bridge of another phase. Therefore, forceful application of a reverse voltage to the clamping diode 5a according to the present embodiment exhibits a particularly pronounced effect in an inverter of multi-phase configuration.

Even when the GCT 2b is turned on at t=$T_2$ or the GCT 2b is turned off at t=$T_3$, the status of circuitry remains unchanged, since the free-wheeling diode 3b still remains in conduction.

When the GCT 2a is turned on at t=T4, the load current is transferred from the free-wheeling diode 3b to the GCT 2a in accordance with the rate of change in current as determined by the voltage E of the d.c. voltage circuit 1 and the suppression group 9a. Even after the current flowing through the free-wheeling diode 3b has been reduced to zero and the load current has flowed through a path comprising the d.c. voltage circuit 1, the suppression group 9a, the GCT 2a, and the output terminal OUTa, in this sequence, the reverse recovery current flows through the free-wheeling diode 3b during the course of application of the voltage E to the d.c. voltage circuit 1. The reverse recovery current flows through a path comprising the d.c. voltage circuit 1, the suppression group 9a, the GCT 2a, the free-wheeling diode 3b, and the d.c. voltage circuit 1, in this sequence. After completion of the reverse recovery operation of the free-wheeling diode 3b, the reverse recovery current induces a current greater than the load current I to flow to the suppression group 9a. Accordingly, the current greater than the load current I circulates through a path comprising the suppression group 9a, the clamping diode 5a, the recovery diode 10a, the recovery capacitor 11a, and the suppression group 9a, in this sequence. The excess energy that is stored in the suppression group 9a is recovered by the recovery capacitor 11a.

As mentioned above, the excess energy that is stored in the suppression group 9, which in the related art has been wastefully dissipated by the discharge resistor 7, is recovered by the recovery capacitor 11a. The energy regenerative circuit 12 can feed back the thus-recovered energy to the d.c. voltage circuit 1.

In the case of a load current of negative polarity, a relative relationship stands between the GCTs 2a and 2b and between the free-wheeling diodes 3a and 3b. Specifically, the status of circuitry is changed by means of the switching operation of the GCT 2b. Such a variation in the status of circuitry can be readily understood from a variation, which would arise in the case of the load current being of positive polarity, and hence its explanation is omitted here.

The circuit operation of the GCTs 2c and 2d or the GCTs 2e and 2f is quite the same as the relationship between the GCTs 2a and 2b, and hence its explanation is omitted here.

The suppression groups 9a, 9b, and 9c are not limited to any particular circuit elements, so long as they have inductance for producing a voltage in proportion to the rate of change in current.

A GCT of reverse conduction type, in which the GCT 2 and the free-wheeling diode 3 are fabricated on a single wafer and housed in a single package, is already commercially available. Naturally, this GCT of reverse conduction type can be employed, and the same can also be applied across the individual embodiments which will be provided below.

As mentioned above, according to the first embodiment, the energy that is stored in all the suppression groups 9a to 9c provided in a plurality of two-level inverter bridges is recycled and is fed back to the d.c. voltage circuit 1 by the energy regenerative circuit 12. As a result, the power loss of the inverter can be diminished. Since the reverse voltage can be applied to the clamping diodes 5a to 5c at any time except during the period of switching operation, the diodes 5a to 5c can be prevented from being unnecessarily brought into conduction, which would otherwise be caused by a variation in the d.c. voltage circuit 1. Consequently, there can be prevented breakage of the main circuit element, which would otherwise be caused by application of an excessive voltage to the clamping diodes 5a to 5c or by faulty turn-on operations of the GCTs 2a to 2f, thereby improving the reliability of the inverter. Further, the inverter of the present embodiment is free of wasteful power dissipation, which would arise in a conventional inverter, and hence the capacity of a cooling device can be diminished, to thereby render the inverter more compact. Thus, there can be embodied an inverter which has increased capacity and reliability and reduced power loss and size, through use of a large-capacity self-arc-extinguishing semiconductor element.

Second Embodiment

Figure 3:
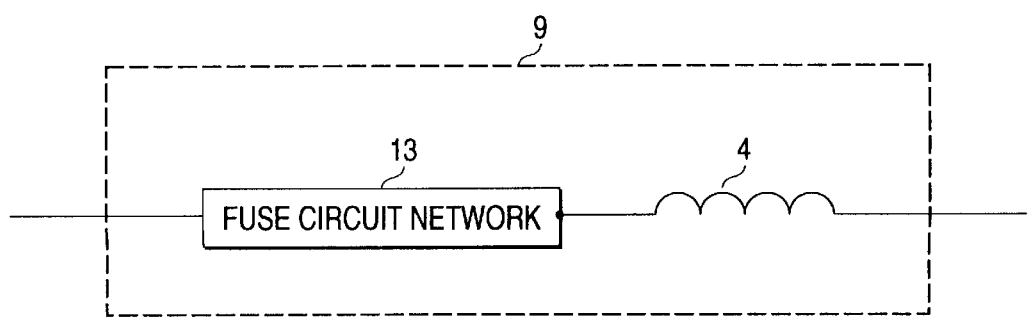
FIG. 3 is a diagram showing the circuit configuration of the principal section of an inverter according to a second embodiment of the present invention.

FIG. 3 is a specific circuit diagram of the suppression group 9, showing the principal section of an inverter according to a second embodiment of the present invention. In other respects, the inverter of the second embodiment is identical in structure with that shown in FIG. 1. In the drawing, reference numeral 13 designates a fuse circuit network, in which a plurality of fuses are connected in series, in parallel, or in series-parallel. In the event of flow of an excessive current through the fuse circuit network 13, the fuse circuit network 13 is fused. Reference numeral 4 designates an anode reactor. Depending on the fusing characteristic of the fuse circuit network 13, the anode reactor 4 must be set to a comparatively large, to thereby limit the rate of increase in current.

Figure 2:
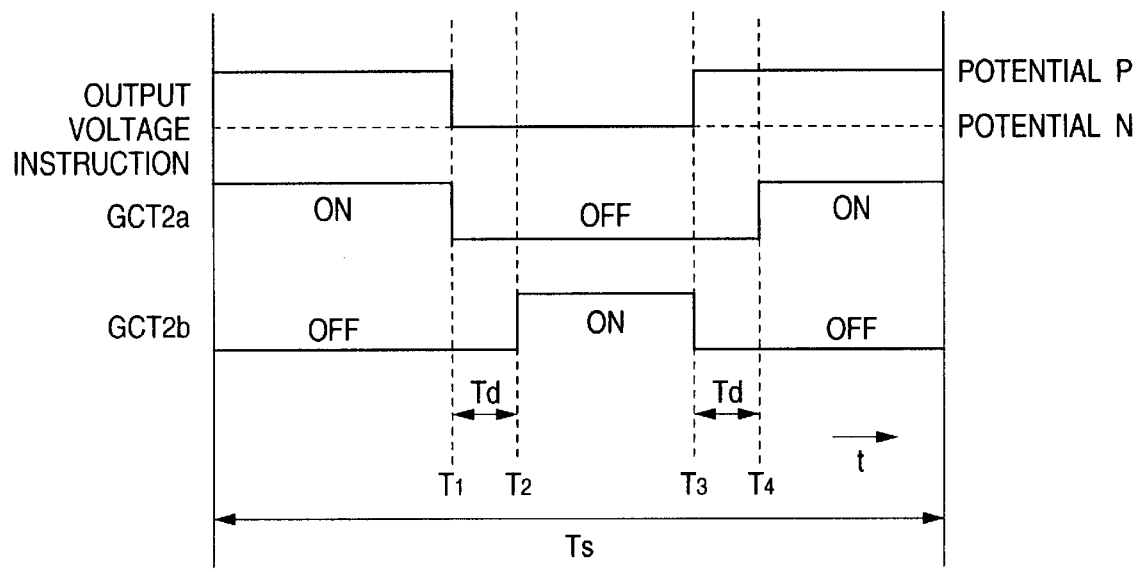
FIG. 2 is a timing chart for describing a method of switching a two-level inverter bridge shown in FIG. 1.
Figure 15:
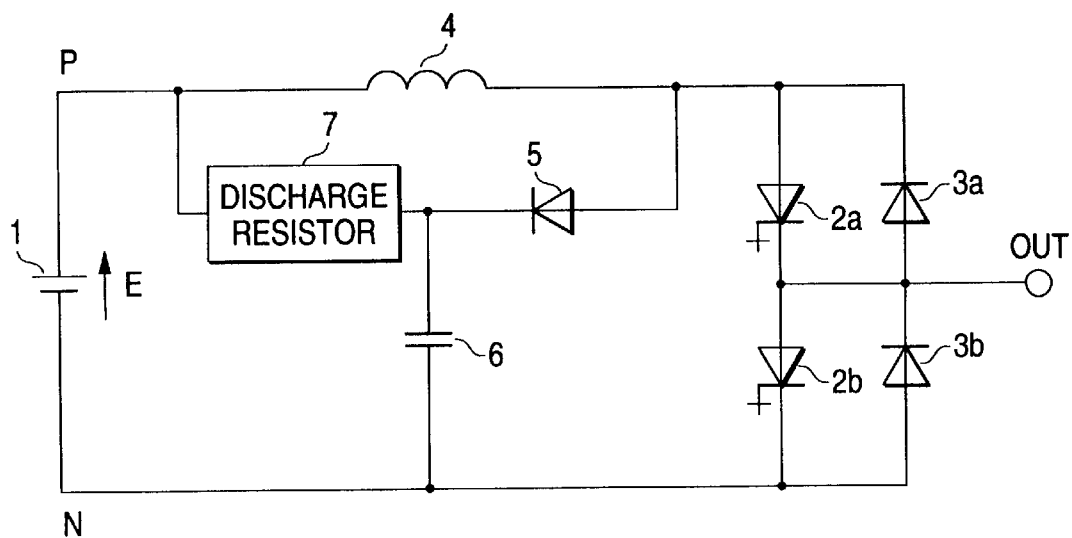
FIG. 15 is a diagram showing the circuit configuration of a conventional inverter.
Figure 16:
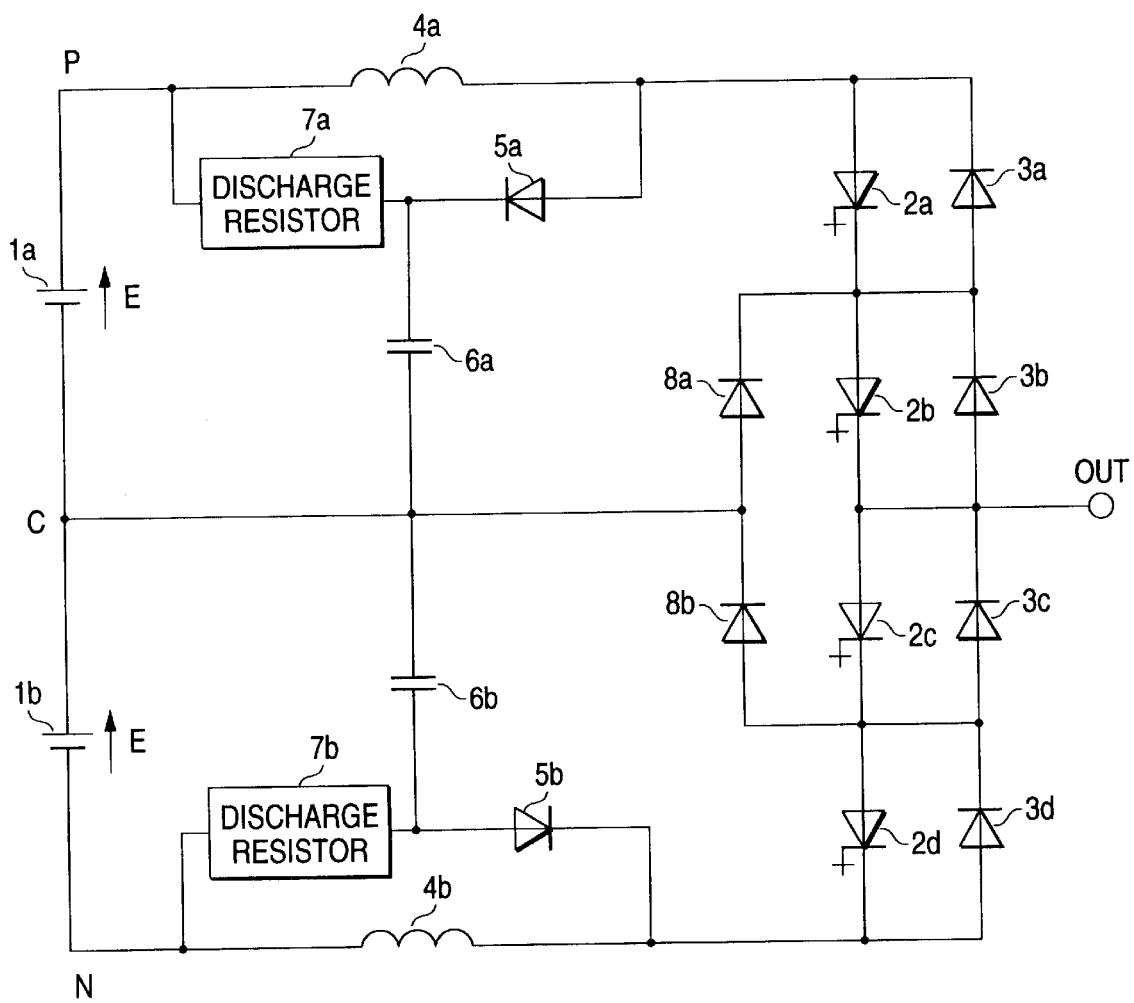
FIG. 16 is a diagram showing another circuit configuration of the conventional inverter.

In the event of a failure in a switching signal generation circuit having the function of producing a switching signal, such as that shown in FIG. 2, and an ON signal being simultaneously applied to the two GCTs 2a and 2b, a short-circuit current will continually flow within a conventional inverter. Such an excessive short-circuit current poses the risk of deformation of a bus bar for interconnecting the constituent elements of circuitry, as well as stretching or scaling-up of an accident. Occurrence of such an accident is not allowed in some of applications of an inverter, and insertion of a fuse into the inverter is inevitable in the field of such an application. If a fuse is provided in the conventional inverter shown in FIG. 15, the power that is wastefully dissipated by the discharge resistor 7 is increased under the constraint that the inductance of the anode reactor 4 must be increased. In contrast, the inverter of the first embodiment shown in FIG. 1 yields an advantage of ability to reduce to as little as possible the power to be wastefully dissipated under such a constraint.

As mentioned above, in the second embodiment, the suppression group 9 is made up of at least the anode rector 4 and the fuse circuit network 13, and the inductance of the anode reactor 4 can be set to a value optimal for the fusing characteristics of the fuse circuit network 13, thereby causing the fuse circuit network 13 to operate unfailingly and to improve the reliability of the inverter.

Third Embodiment

Figure 4:
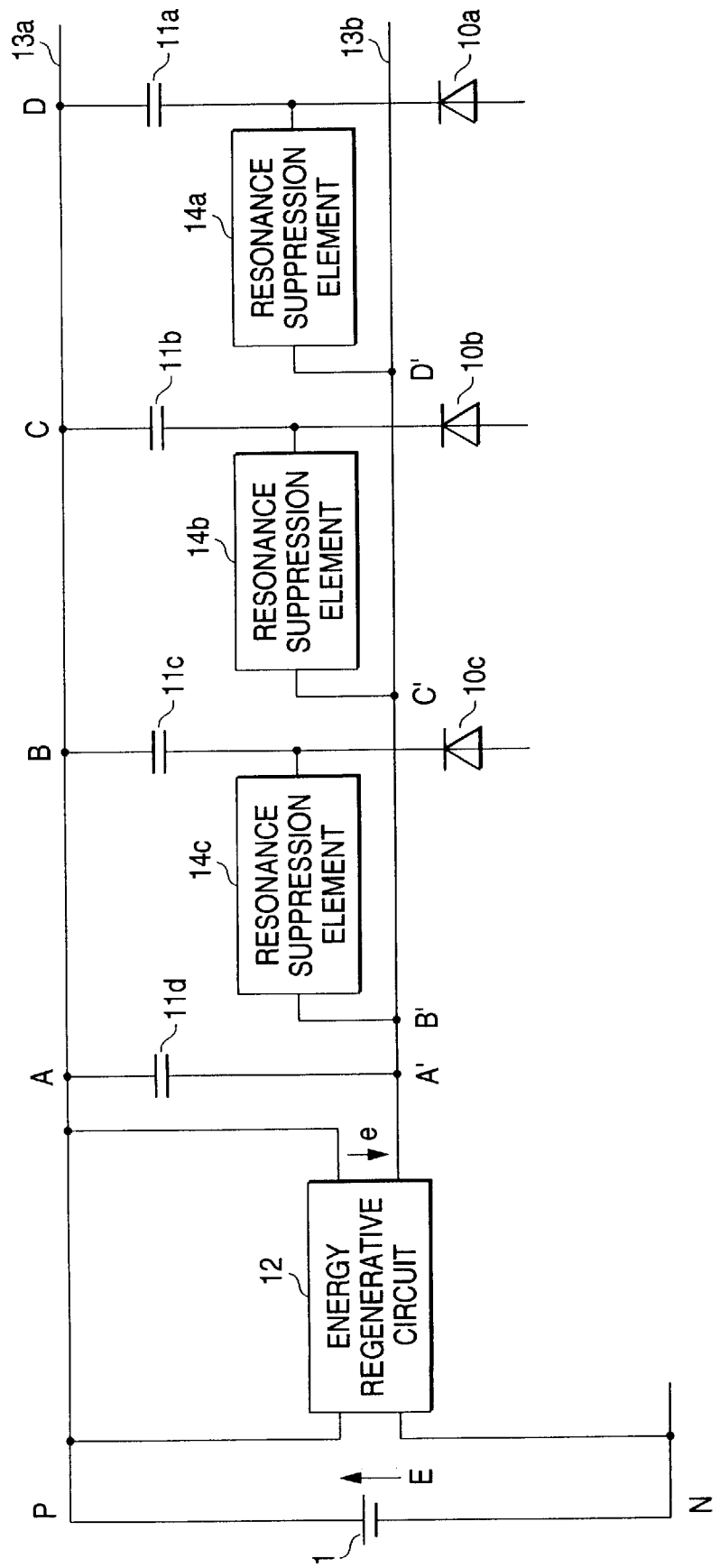
FIG. 4 is a diagram showing the circuit configuration of the principal section of an inverter according to a third embodiment of the present invention.

FIG. 4 is a circuit diagram showing the configuration of circuitry when the energy regenerative circuit 12 is commonly connected to a plurality of recovery capacitors 11a, 11b, and 11c, showing the principal section of an inverter according to a third embodiment of the present invention. The specific method for connecting the three recovery capacitors 11a, 11b, and 11c to the energy regenerative circuit 12 is shown here. In other respects, the inverter is identical with that shown in FIG. 1. In the drawing, reference numeral 11d designates an auxiliary recovery capacitor connected directly to the energy recovery circuit 12; 13a designates a bus bar of potential P; 13b designates a bus bar whose potential is higher than the potential P by only the charging voltage "e" of the recovery capacitor 11d; 10a designates a recovery diode connected to the recovery capacitor 11a; 10b designates a recovery diode connected to the recovery capacitor 11b; and 10c designates a recovery diode connected to the recovery capacitor 11c. Reference numerals 14a, 14b, and 14c designate resonance suppression elements to be inserted when the recovery capacitors 11a, 11b, and 11c are connected to the bus bar 13. The resonance suppression elements 14a to 14c can be formed from, for example, a resistor of small resistance value. Here, the recovery capacitor 11d is not indispensable and maybe omitted. However, in order to suppress variations in voltages of all the recovery capacitors, as well as to stably activate the energy regenerative circuit 12, use of the recovery capacitor 11d is preferable.

Next will be described the operations of the resonance suppression elements 14a, 14b, and 14c. The recovery capacitors 11a, 11b, and 11c are usually spaced apart from one another. Accordingly, as shown in FIG. 4, stray inductance exists in a path between points B and C, between points B' and C', between points C and D, and between points C' and D' as determined by a distributed constant. Therefore, it is impossible to prevent the stray inductance from inducing a resonance phenomenon in the recovery capacitors 11a to 11d. Depending on the level of an oscillating current stemming from the resonance phenomenon, the root-mean-square value of the current flowing through the recovery capacitors 11a to 11d is increased, which in turn renders the inverter bulky. As shown in FIG. 4, one of the two terminals of the recovery capacitor 11a which is not connected to potential P is connected to the bus bar 13b by way of the resonance suppression element 14a. Likewise, one of the two terminals of the recovery capacitor 11b which is not connected to potential P is connected to the bus bar 13b by way of the resonance suppression element 14b. One of the two terminals of the recovery capacitor 11c which is not connected to potential P is connected to the bus bar 13b by way of the resonance suppression element 14c. By means of such a connection, the previously-described oscillating current is effectively prevented, thereby suppressing the root-mean-square value of the current flowing through the recovery capacitors 11a to 11d.

An advantage of inserting the resonance suppression elements 14a, 14b, and 14c at the positions shown in FIG. 4 will be described below. Specifically, when the recovery capacitors 11a, 11b, and 11c recover the energy that is stored in the suppression groups 9a, 9b, and 9c provided in respective unillustrated two-level inverter bridges, recovery of the energy is effected without use of the resonance suppression elements 14a, 14b, and 14c. In contrast, the energy regenerative circuit 12 extracts the energy to be regenerated from the recovery capacitors 11a, 11b, 11c, and 11d by way of the resonance suppression elements 14a, 14b, and 14c.

Although the number of two-level inverter bridges shown in FIG. 4 is limited to three, it is naturally evident that the way to inserting the resonance suppression elements 14a, 14b, and 14c shown in FIG. 4 into the inverter can be applied to a case where an arbitrary number "n" of two-level inverter bridges (where "n" is an integer satisfying n≧1).

Fourth Embodiment

Figure 5:
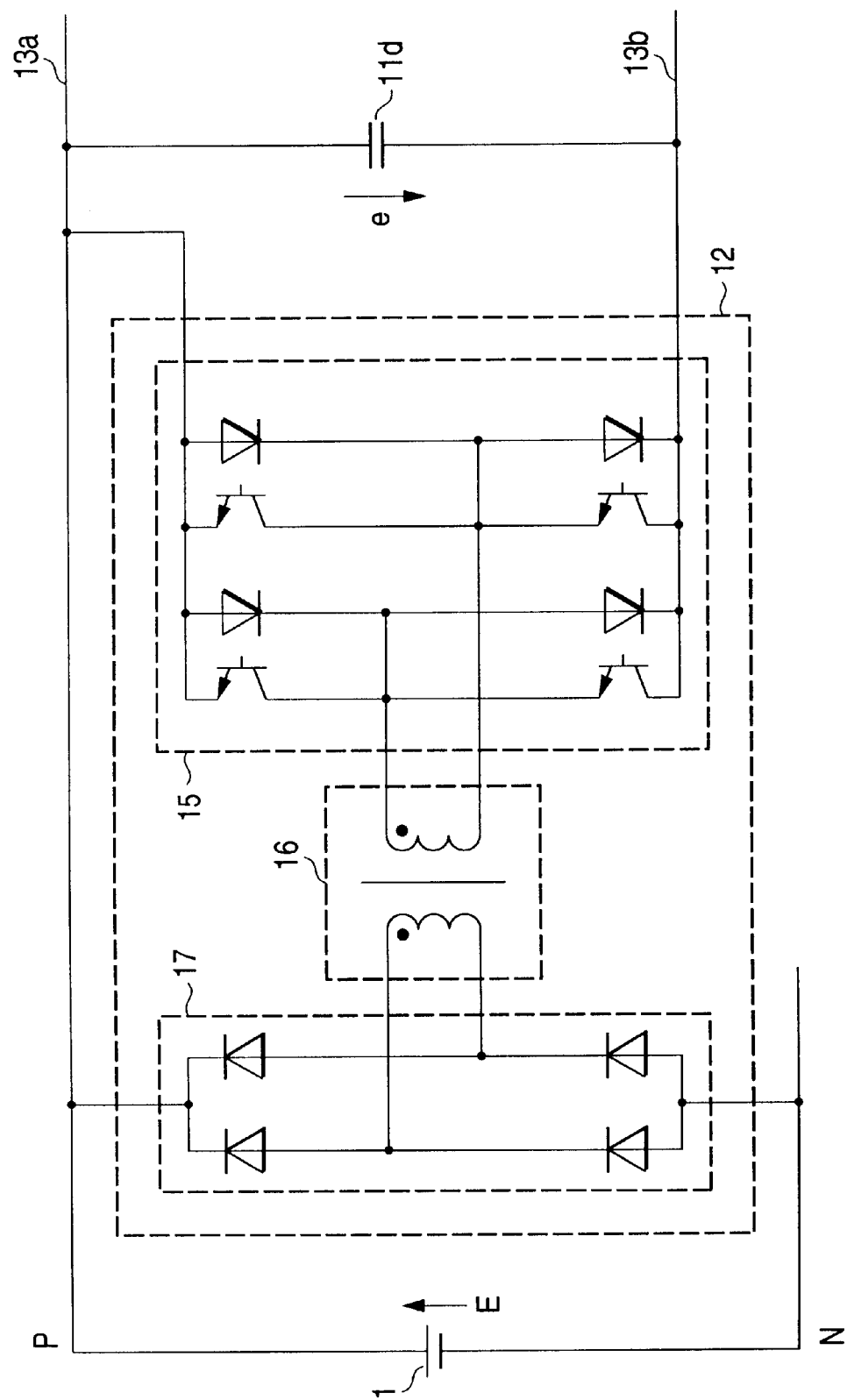
FIG. 5 is a diagram showing the circuit configuration of the principal section of an inverter according to a fourth embodiment of the present invention.

FIG. 5 is a specific circuit diagram showing the configuration of the energy regenerative circuit 12, showing the principal section of an inverter according to a fourth embodiment of the present invention. In other respects, the inverter is identical with those shown in FIG. 1 or 4. In the drawing, reference numeral 15 designates a single-phase inverter connected to the recovery capacitor 11d; 16 designates a step-up transformer; and 17 designates a diode rectifier connected to an output terminal of the step-up transformer 16. The configuration of the energy regenerative circuit 12 comprising the single-phase inverter 15, the step-up transformer 16, and the diode rectifier 17 corresponds to a widely-utilized DC-DC converter. A step-up DC-DC converter of any configuration may be used as the energy regenerative circuit 12, and the DC-DC converter is not: required to have a specified circuit configuration.

In respect of the inverter shown in FIG. 1, in the case where the load current assume a value of zero; for example, in a case where the load is a motor which is driven intermittently and the inverter is activated according to an operation pattern involving a long period of time during which the load current assumes a value of zero, the energy to be recovered by the recovery capacitors 11a, 11b, and 11c does not arise in the suppression groups 9a, 9b, and 9c. Accordingly, the single-phase inverter 15 is deactivated in the period of time during which a detected value of the load current is zero, thereby preventing power loss or drive power, which would be caused by the energy regenerative circuit 12, and enabling power saving operation.

Fifth Embodiment

An inverter according to a fifth embodiment of the present invention will now be described. In FIG. 5, it is evident that the voltage of the recovery capacitor 11d can be increased or decreased by controlling the conduction ratio of the single-phase inverter 15. In FIG. 1, time $T_6$ required for the recovery capacitors 11a, 11b, and 11c to recover the energy stored in the suppression groups 9a, 9b, and 9c. can be determined by the following equation, provided that inductance of the entirety of the suppression group 9a (or 9b or 9c) is taken as $L_2$ and an initial current is taken as $I_1$.

$$T_6 = \frac{I_1 \cdot L_2}{e}$$

If the voltage of the recovery capacitor 11a (or 11b or 11c) is high, time $T_6$ can be diminished. In contrast, if the load current becomes greater, the initial current $I_1$ is also increased, thus extending time $T_6$. From these relationships, time $T_6$ can be controlled by controlling the voltage "e" of the recovery capacitor 11a according to the load current. In the case of, for example, a three-phase load, it is thought that the voltage of the recovery capacitor 11d is controlled so as to make time $T_6$ constant in accordance with the root-mean-square value of a three-phase load current.

If the inverter is activated by means of PWM control, the cycle $T_s$ of PWM shown in FIG. 2 is constant, and the GCTs 2a and 2b are switched at least once in each cycle $T_s$ without fail. If the time during which the output voltage instruction is of potential N can be shortened, the voltage which can be output in the cycle $T_s$ of PWM is increased, thereby enabling an increase in the capacity of the inverter. However, the time during which the PWM signal is of potential N cannot be shortened unlimitedly. The reason for this will now be described.

The maximum value of the load current is usually greater than the maximum value of the reverse recovery current of the free-wheeling diode 3. Accordingly, the amount of energy that is stored in the suppression groups 9a, 9b, and 9c at the time of turn-on operation of the GCT 2 (at $T_2$ or $T_4$) is smaller than that stored in the suppression groups 9a, 9b, and 9c at the time of turn-off operation of the GCT 2 (at $T_1$ or $T_3$). The following description will be made by focusing on the turn-off operation of the GCT 2a at $t=T_1$.

In FIG. 2, the GCT 2a performs turn-off operation at $t=T_1$. In the event that operations of the GCT 2a up to the turn-on operation to be performed at $t=T_4$ are performed within the period of time $T_6$ as a result of shut-off of the load current, the clamping diode 5a still remains in conduction, and hence the GCT 2a is subjected to the load of an excessive rate of increase, which may cause the problem of the conventional device. So long as the domain of time ($T_1$ to $T_4$) is set to be shorter than the period of time $T_6$, such a problem can be avoided. For these reasons, shortening of the time during which a voltage of potential N must be output to the output terminal OUT during the cycle $T_s$ of PWM is limited.

In the event that the load current becomes greater, time $T_6$ is extended if the voltage "e" of the recovery capacity 11a is constant. Hence, the time during which the output voltage instruction is of potential N must be set to become longer, and, by extension, the voltage which can be output to the output terminal OUTa must be diminished. Consequently, if the load current becomes greater, the voltage "e" of the recovery capacitor 11a is increased to shorten time $T_6$ in accordance with the root-mean-square value of the load current, to thereby prevent the foregoing problem of the GCT 2a being subjected to the load of an excessive rate of increase and to thereby increase the voltage which can be output to the output terminal OUTa during the cycle $T_s$ of PWM. Thus, the output voltage of the inverter is increased, to thereby increase the capacity of the inverter.

As mentioned above, according to the present embodiment, the charging voltage of the recovery capacitor 11 is increased in accordance with the magnitude of the load current, to thereby shorten the time required for the recovery capacitor 11 to recover the energy stored in the suppression group 9. Accordingly, the voltage which can be output to the output terminal during the PWM cycle can be increased, to thereby increase the capacity of the inverter.

Sixth Embodiment

Figure 6:
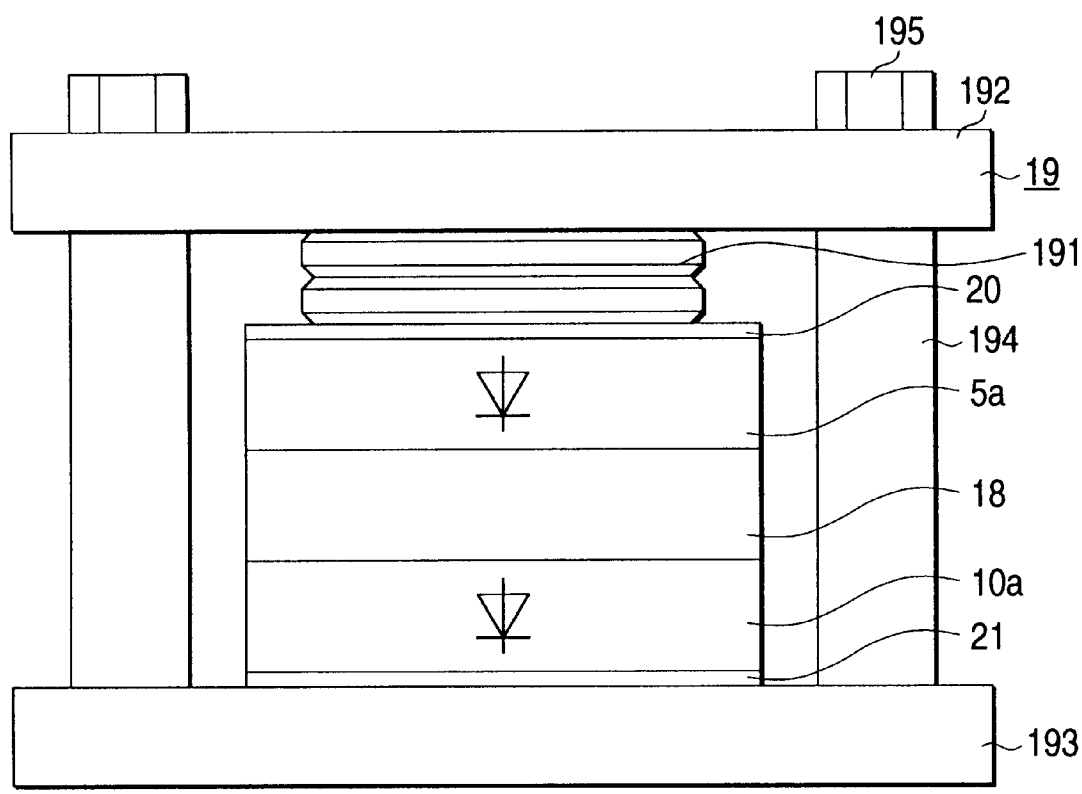
FIG. 6 is a front view showing the circuit configuration of the principal section of an inverter according to a sixth embodiment of the present invention.

FIG. 6 is a front view of a structure formed by bringing the clamping diode 5a and the recovery diode 10a into pressed contact with each other, showing the principal section of an inverter according to a sixth embodiment of the present invention In other respects, the inverter is identical with that shown in FIG. 1. In the drawing, reference numeral 18 designates a cooling fin made of a conductor; 19 designates a structure formed by bringing the clamping diode 5a and the recovery diode 10a into pressing contact with each other (hereinafter referred to simply as a "structure"); 191 designates an insulator; 192 and 193 designate end plates formed of, for example, stainless steel; 194 designates a bolt; 195 designates a nut; and 20 and 21 designate conductors. The conductor 20 is connected to the anode terminal of the GCT 2a, and the conductor 21 is connected to the recovery capacitor 11a.

In FIG. 1, the clamping diode 5a and-the recovery diode 10a are connected, for example, in series. A flat diode package, which has the same diameter as that of the clamping diode 5 and the recovery diode 10a and preferably requires the same clamping force as that required to clamp the clamping diode 5 and the recovery diode 10a, is brought into pressing contact with the clamping diode 5a and the recovery diode 10a. As shown in FIG. 6, the cathode surface of the clamping diode 5a is brought into pressing contact with one surface of the single cooling fin 18, and the anode surface of the recovery diode 10a is brought into pressing contact with the remaining surface of the cooling fin 18. Consequently, all these elements can be housed within the single structure 19, and it is also thought that the conductors 20 and 21 can be clamped together within the structure 19.

In the example shown in FIG. 6, the cathode surface of the clamping diode 5a is disposed opposite the anode surface of the recovery diode 10a, with the cooling fin 18 being interposed therebetween, thus constituting a stacked member. The conductors 20 and 21 are disposed on respective sides of the stacked member, and the stacked member is sandwiched between the end plates 192 and 193. The insulator 191 is interposed at least either between the conductor 20 and the end plate 192 or between the conductor 21 and the end plate 193, and predetermined force is exerted on the stacked member by means of the bolts 194 and the nuts 195. As a result, the cathode surface of the clamping diode 5a and the anode surface of the recovery diode 10a are brought into pressing contact with respective sides of the cooling fin 18.

Preferably, the clamping diode 5a and the recovery diode 10a are formed from the same diode.

Further, an elastic insulator is preferably used as the insulator 191.

As mentioned above, according to the sixth embodiment, the clamping diode 5 and the recovery diode 10 can be cooled through use of the single cooling fin 18, and hence the inverter can be made compact and inexpensive.

Seventh Embodiment

Figure 7:
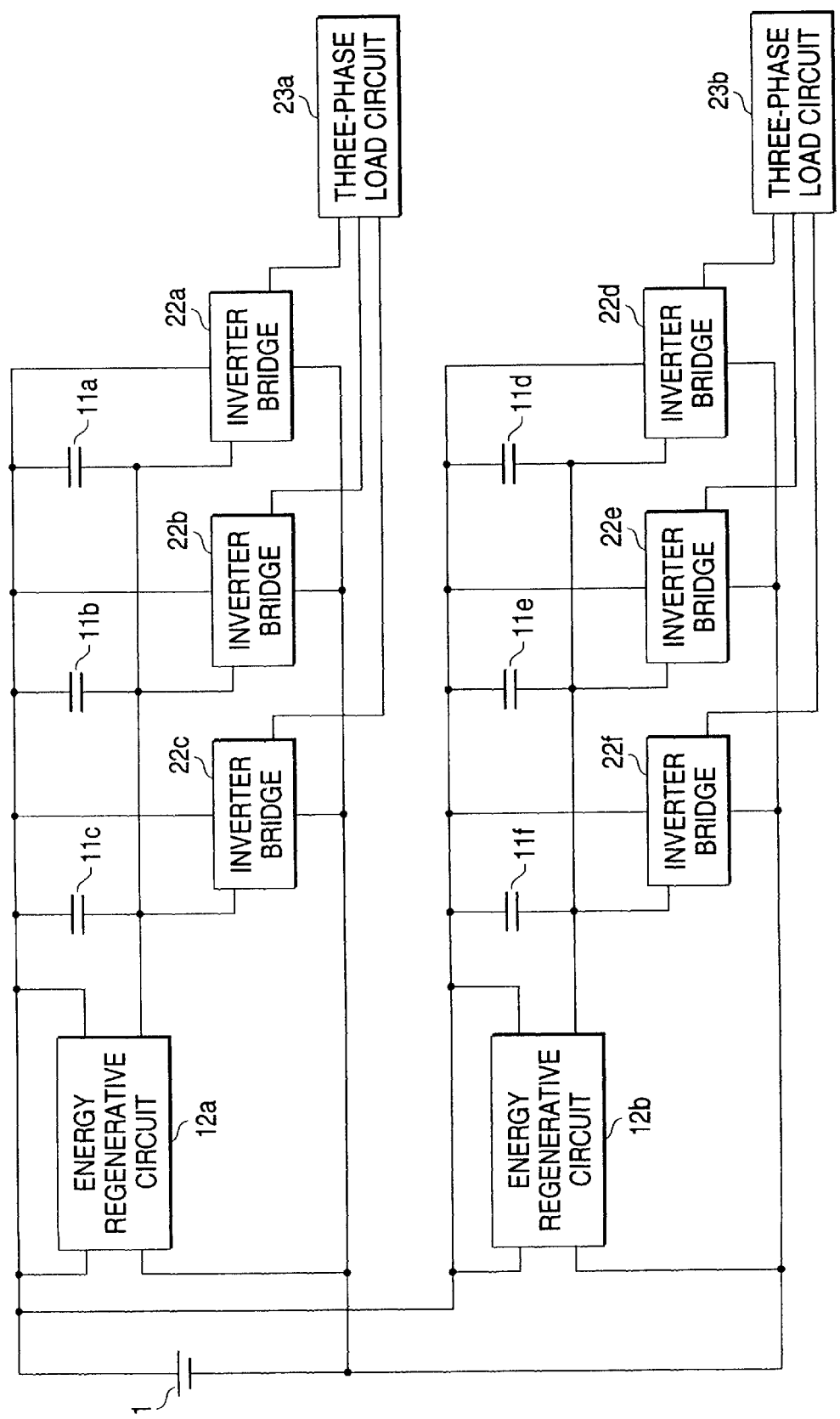
FIG. 7 is a diagram showing the circuit configuration of the principal section of an inverter according to a seventh embodiment of the present invention.

FIG. 7 is a diagram showing the circuit configuration of an inverter according to a seventh embodiment of the present invention. In the drawing, reference numerals 22a to 22f designate inverter bridges, showing the elements of the circuit shown in FIG. 1 exclusive of the recovery capacitor 11. In FIG. 7, six inverter bridges 22a to 22f are connected to the d.c. voltage circuit 1; specifically, three inverter bridges 22a, 22b, and 22c are connected to a first three-phase load circuit 23a, and the remaining three inverter bridges 22d, 22e, and 22f are connected to a second three-phase load circuit 23b. A first energy regenerative circuit 12a is connected to the inverter bridges 22a, 22b, and 22c connected to the first three-phase load circuit 23a. A second energy regenerative circuit 12b is connected to the inverter bridges 22d, 22e, and 22f connected to the second three-phase load circuit 23b. For example, the first energy regenerative circuit 12a is commonly connected to the recovery capacitors 11a, 11b, and 11c, and the second energy regenerative circuit 12b is commonly connected to the recovery capacitors 11d, 11e, and 11f. The first and second energy regenerative circuits 12a and 12b are connected to the single d.c. voltage circuit 1.

Control of the charging voltage of the recovery capacitor 11 in proportion to the magnitude of the load current, such as that described in connection with the fifth embodiment, is considered to be applied to the above-described system configuration in which the plurality of load circuits 23a and 23b are controlled through use of the single d.c. voltage circuit 1. The load currents flowing through the respective load circuits 23a and 23b differ from each other. Hence, the charging voltage of the recovery capacitors 11a, 11b, and 11c must be controlled to assume a certain value by the energy regenerative circuit 12a, and the charging voltage of the recovery capacitors 11d, 11e, and 11f must be controlled to assume an another, different value by the energy regenerative circuit 12b. The circuit configuration shown in FIG. 7 enables control of the charging voltage of the recovery capacitors 11a, 11b, and 11c of the respective three inverter bridges 22a, 22b, and 22c connected to the first three-phase load circuit 23a, effected in accordance with the magnitude of the load current (for example, the root-mean-square value) flowing through the load circuit 23a, independently of control of the charging voltage of the recovery capacitors 11d, 11e, and 11f of the respective three inverter bridges 22d, 22e, and 22f connected to the second three-phase load circuit 23b, effected in accordance with the magnitude of the load current (for example, the root-mean-square value) flowing through the load circuit 23b. The charging voltage of the recovery capacitors 11a to 11c can be controlled so as to assume an optimal value for the energy regenerative circuit 12a. Further, the charging voltage of the recovery capacitors 11d to 11f can be controlled so as to assume an optimal value for the energy regenerative circuit 12b. As a result, the maximum output voltage of each of the inverter bridges 22a to 22f can be increased.

FIG. 7 shows a circuit configuration in which two three-phase load circuits 23a and 23b are connected together. Needless to say, the number of load circuits 23 is not limited to two.

Further, although FIG. 7 shows the load circuits 23 of three-phase, it can be readily understood that the present embodiment can be applied to load circuits whose terminals are lesser or greater in number than three.

Application of the present embodiment does not raise any problem, regardless of whether the load circuit 23 is an electric motor or an a.c. power supply.

Eighth Embodiment

Figure 8:
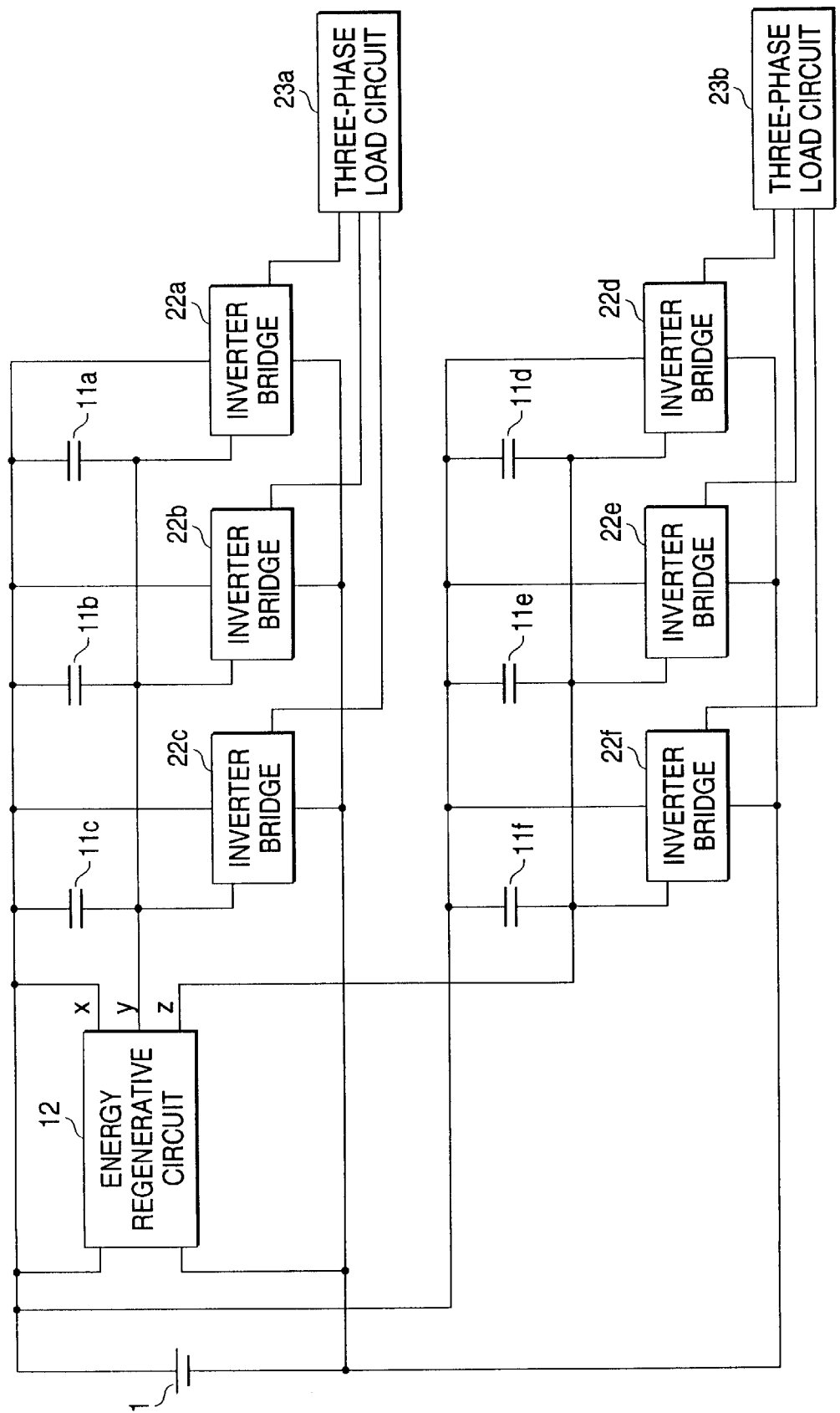
FIG. 8 is a diagram showing the circuit configuration of the principal section of an inverter according to an eighth embodiment of the present invention.

FIG. 8 is a diagram showing the circuit configuration of an inverter according to an eighth embodiment of the present invention. In FIG. 8, six inverter bridges 22a to 22f are connected to the d.c. voltage circuit 1. The three inverter bridges 22a, 22b, and 22c are connected to the first three-phase load circuit 23a, and the remaining three inverter bridges 22d, 22e, and 22f are connected to the second three-phase load circuit 23b. The single energy regenerative circuit 12 is connected to all the inverter bridges 22a to 22f.

Figure 9:
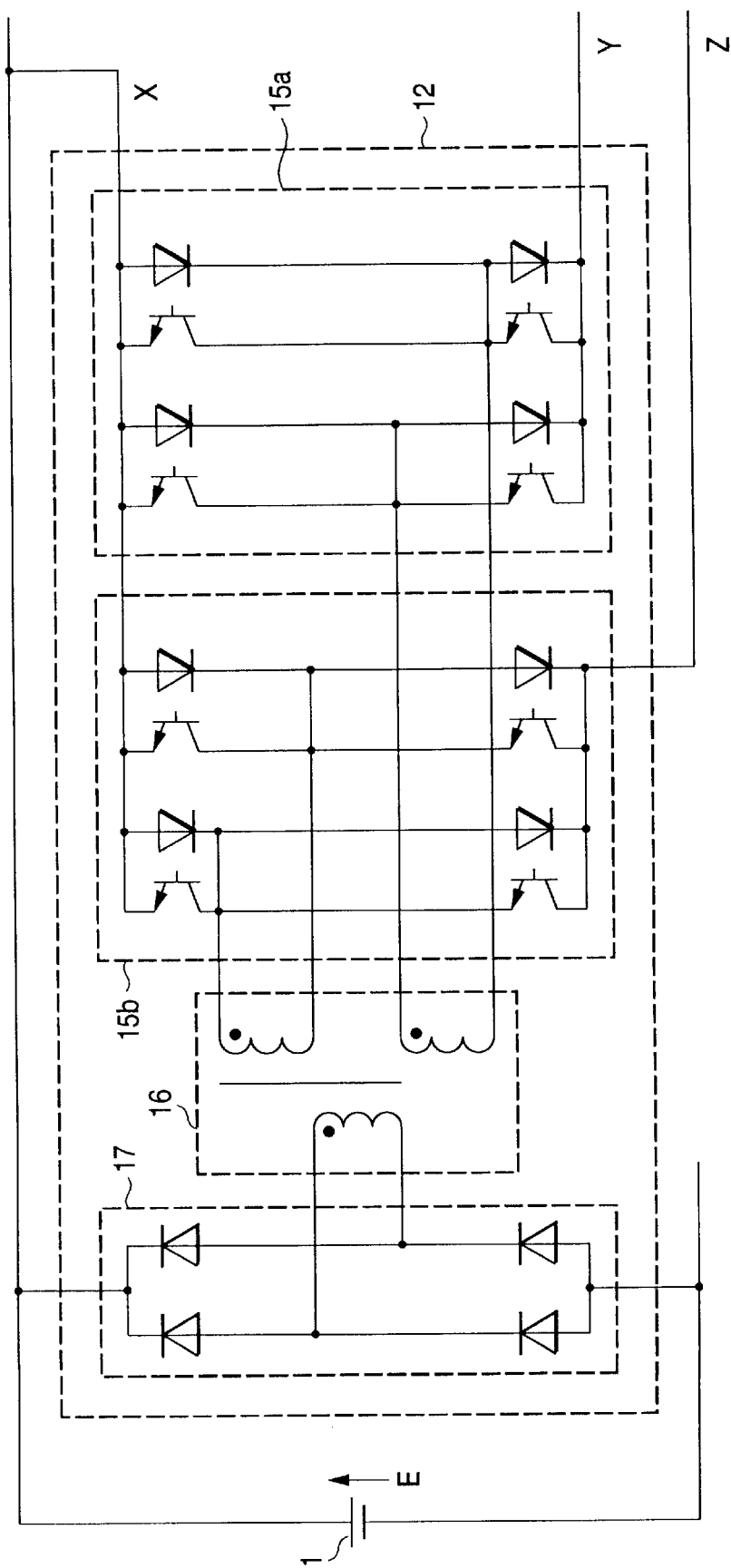
FIG. 9 is a diagram showing the circuit configuration of the principal section of the inverter shown in FIG. 8.

FIG. 9 shows a specific circuit configuration of the energy regenerative circuit 12 which enables control of the charging voltage of the recovery capacitors 11a, 11b, and 11c of the respective three inverter bridges 22a, 22b, and 22c connected to the first three-phase load circuit 23a, independently of control of the charging voltage of the recovery capacitors 11d, 11e, and 11f of the respective three inverter bridges 22d, 22e, and 22f connected to the second three-phase load circuit 23b. The energy regenerative circuit 12 shown in FIG. 9 differs from that shown in FIG. 5 in that the energy regenerative circuit 12 of the present embodiment comprises single-phase inverters 15a and 15b and primary windings which are provided on the low-voltage side of the step-up transformer 16 so as to correspond to the single-phase inverters 15a and 15b, respectively.

Each of the energy regenerative circuits 12a and 12b shown in FIG. 7 is constituted of the energy regenerative circuit 12 shown in FIG. 5. Hence, two independent step-up transformers 16 must be provided in the circuit. In contrast, the single secondary winding provided on the high-voltage side of the transformer 16 is shared among the plurality of primary windings, by means of the energy regenerative circuit 12 shown in FIG. 8. Accordingly, the inverter of the eighth embodiment comprising the single step-up transformer 16 can yield the same advantage as that yielded by the seventh embodiment.

Although FIG. 8 shows a circuit configuration comprising the two three-phase interconnected load circuits, it goes without saying that the number of the load circuits 23 is not limited to two. Accordingly, the primary winding of the step-up transformer 16 is not limited to a double winding, and the number of the primary windings can be considered to increase in accordance with the number of load circuits 23.

Although FIG. 8 shows the load circuits 23 of three phase, it can be readily understood that the present embodiment can be applied to load circuits whose terminals are lesser or greater in number than three.

Application of the present embodiment does not raise any problem, regardless of whether the load circuit 23 is an electric motor or an a.c. power supply.

Ninth Embodiment

Figure 10:
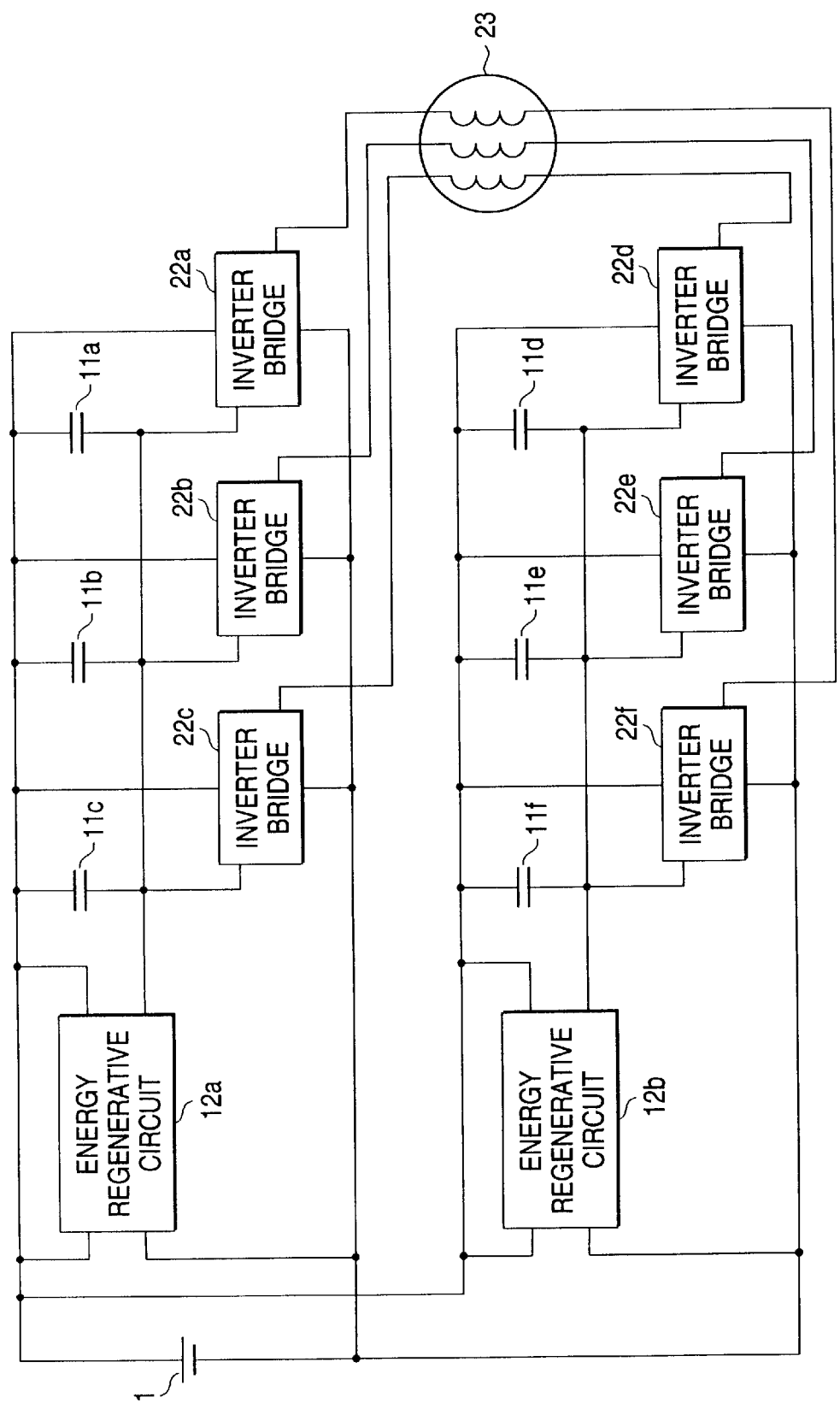
FIG. 10 is a diagram showing the circuit configuration of an inverter according to a ninth embodiment of the present invention.

FIG. 7 shows the inverter in which the first load circuit 23a differs from the second load circuit 23b. For example, as shown in FIG. 10, the load circuit 23 is formed from a single-phase wire-wound motor. In such a case, three-phase wire-wound motors are taken as a single set, as illustrated in the drawing. The energy regenerative circuits 12a and 12b can be applied to each set.

Figure 11:
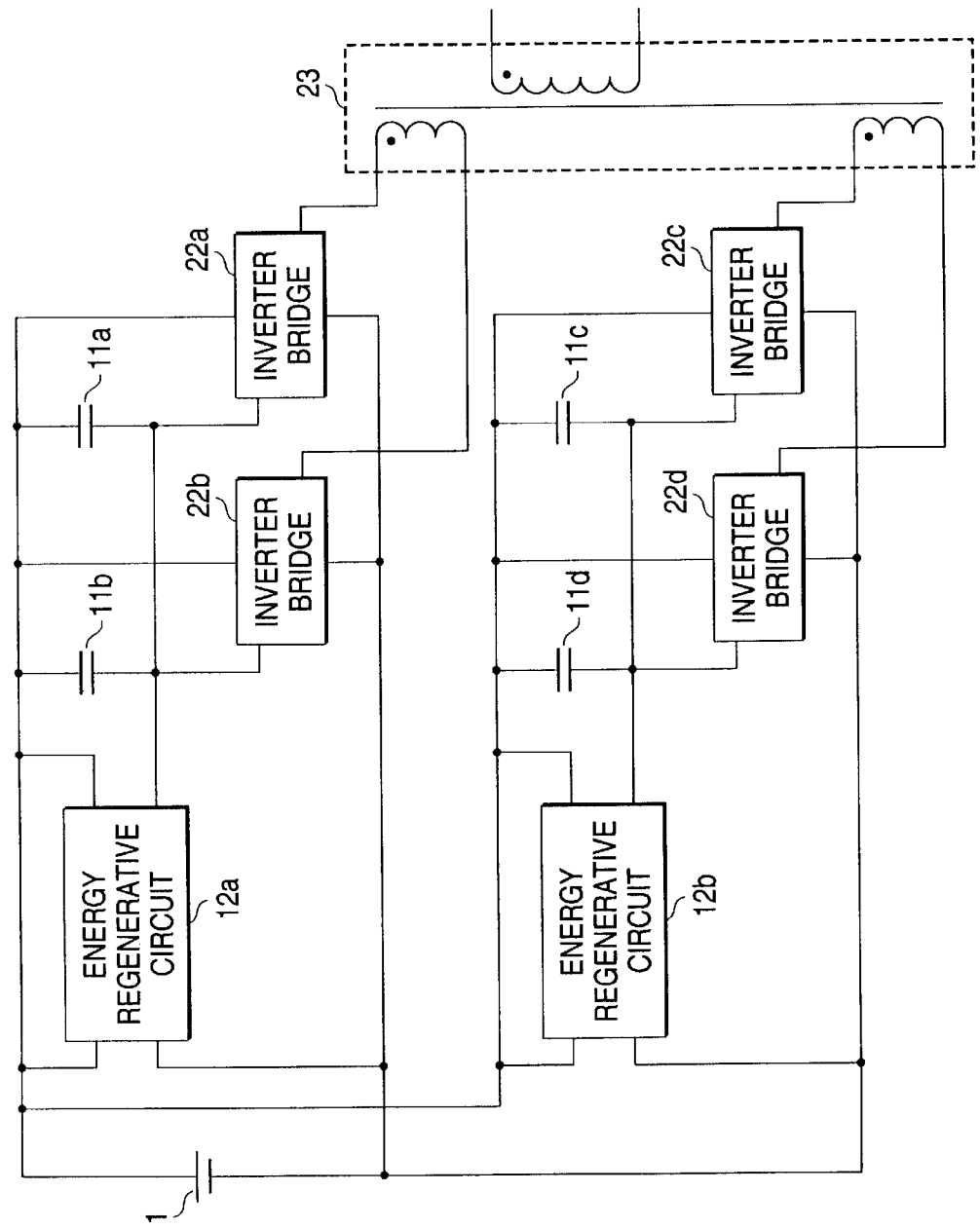
FIG. 11 is a diagram showing another circuit configuration of the inverter according to the ninth embodiment of the present invention.

In contrast, as shown in FIG. 11, in a circuit configuration in which the load circuit 23 is formed by connecting single-phase transformers in series, two single-phase transformers are taken as a single set, as illustrated in the drawing. The energy regenerative circuits 12a and 12b can be applied to each set.

Needless to say, the above description given with reference to FIGS. 10 and 11 can be applied also to the energy regenerative circuit 12 shown in FIG. 8.

Although the single-phase wire-wound motor is taken as the load circuit 23 to which the energy regenerative circuits 12a and 12b are to be commonly connected, a circuit configuration which is of completely the same circuit configuration as that mentioned above can be employed even when another load circuit, such as a three-phase multiplex-wound motor, is used.

Even when the load circuits 23, which differ from each other in the number of phases, like the relationship between the load circuit 23 shown in FIG. 10 and the load circuit 23 shown in FIG. 11, are connected to the single d.c. voltage circuit 1, the circuit configurations shown in FIGS. 10 and 11 can be naturally employed.

More specifically, in a case where the plurality of inverter bridges 22 are connected to a single d.c. voltage circuit, the plurality of inverter bridges 22 are divided into a plurality of groups. The different energy regenerative circuit 12 is connected to each of the groups of inverter bridges 22. Each of the energy regenerative circuits 12 is configured to feed back power to the d.c. voltage circuit 1. As a result, the charging voltage of the recovery capacitor 11 can be independently controlled on a per-group basis. For instance, the charging voltage of the recovery capacitor 11 is controlled to assume an optimal value for each energy regenerative circuit 12 in accordance with the current flowing through the load circuit, thereby increasing the maximum output voltage of each of the inverter bridges 22.

The energy regenerative circuit 12 comprises the step-up transformer 16 which has a plurality of low-voltage primary windings and a single high-voltage secondary winding. In a case where the plurality of inverter bridges 22 are connected to the single d.c. voltage circuit 1, the plurality of inverter bridges 22 are vided into a plurality of groups. A different low-voltage primary winding is connected to the inverter bridge 22 on a per-group basis. As a result, the charging voltage of the recovery capacitor 11 can be independently controlled on a per-group basis. For example, the maximum output voltage off each of the inverter bridges 22 can be increased by controlling the charging voltage of the recovery capacitor 11 to an optimal value for each group, in accordance with the current flowing through each of the load circuits. Further, in the above-described circuit configuration, the single secondary winding of the step-up transformer 6 belonging to the energy regenerative circuit 12 can shared between the plurality of primary windings. Therefore, the inverter requires only a single energy regenerative circuit 12, thereby rendering the inverter compact.

Tenth Embodiment

Figure 12:
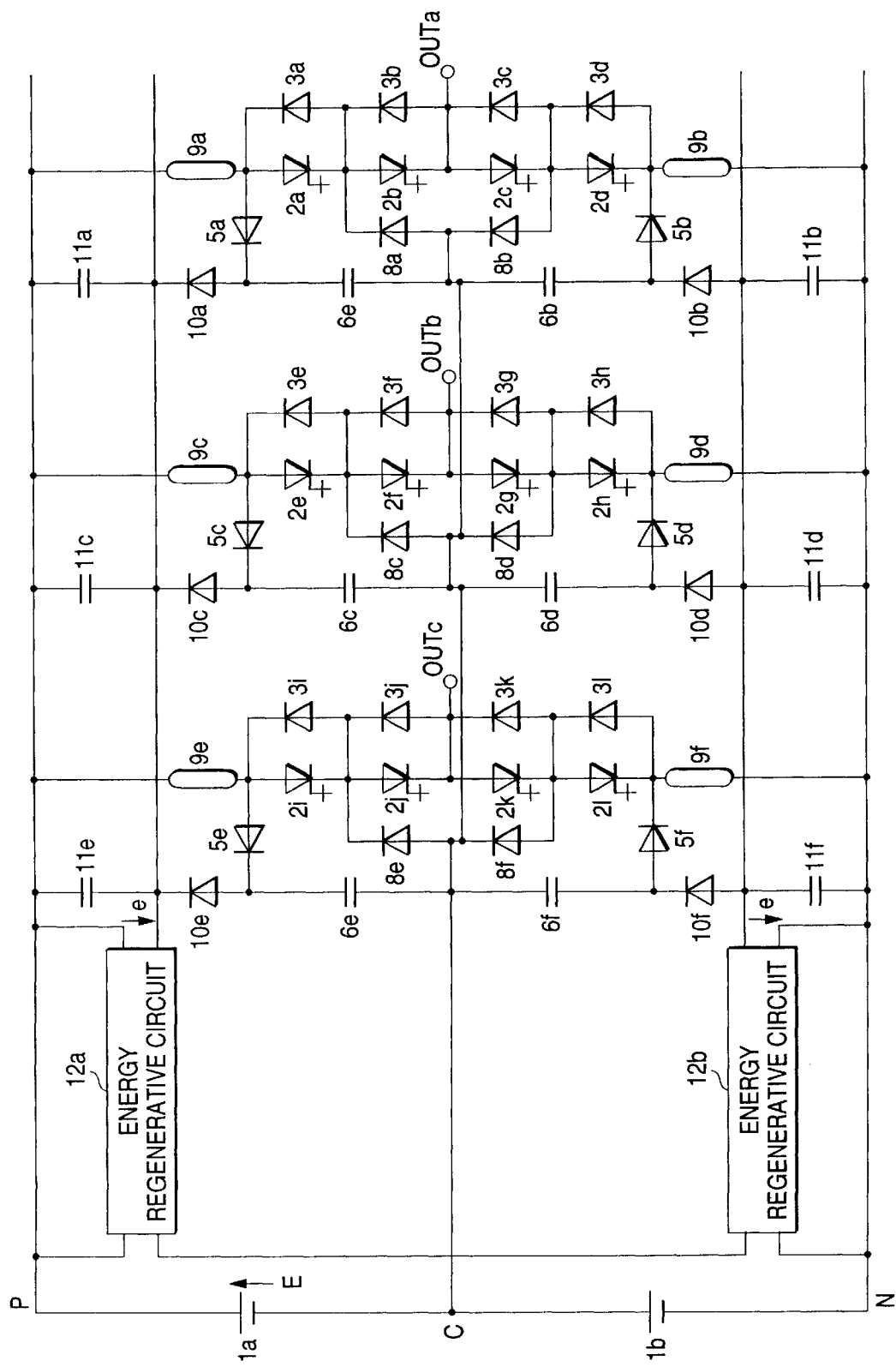
FIG. 12 is a diagram showing the circuit configuration of an inverter according to a tenth embodiment of the present invention.

FIG. 12 is a circuit diagram showing an inverter which comprises a three-level inverter bridge according to a tenth embodiment of the present invention. Although FIG. 12 shows an inverter bridge of three-phase configuration, the present embodiment is not limited thereto.

First will be described the circuit configuration shown in FIG. 12. In the drawing, reference numeral 1*a* designates a d.c. voltage circuit imparted with potential P and potential C (corresponding to potential E) ; and 1*b* designates a d.c. circuit configuration imparted with potential C and potential N (corresponding to potential E). Reference numerals 2*a* to 2*l* designate GCTs acting as self-ac-extinguishing semiconductor elements, wherein 2*a*, 2*e*, and 2*i* designate first GCTs; 2*b*, 2*f*, and 2*j* designate second GCTs; 2*c*, 2*g*, and 2*k* designate third GCTs; and 2*d*, 2*h*, and 2*l* designate fourth GCTs. Reference numerals 3*a* to 3*l* designate free-wheeling diodes connected in reverse orientation and in parallel with the respective GCTs 2*a* to 2*l*, wherein 3*a*, 3*e*, and 3*i* designate first free-wheeling diodes; 3*b*, 3*f*, and 3*j* designate second free-wheeling diodes; 3*c*, 3*g*, and 3*k* designate third free-wheeling diodes; and 3*d*, 3*h*, and 31 designate fourth free-wheeling diodes. Reference numerals 5*a* to 5*f* designate clamping diodes, wherein 5*a*, 5*c*, and 5*e* designate first clamping diodes; and 5*b*, 5*d*, and 5*f* designate second clamping diodes. Reference numerals 6*a* to 6*f* designate clamping capacitors, wherein 6*a*, 6*c*, and 6*e* designate first clamping capacitors; and 6*b*, 6*d*, and 6*f* designate second clamping capacitors. A first serially-connected member is constituted of the first clamping diodes 5*a*, 5*c*, and 5*e* and the first clamping capacitors 6*a*, 6*c*, and 6*e*. A second serially-connected member is constituted of the second clamping diodes 5*b*, 5*d*, and 5*f* and the second clamping capacitors 6*b*, 6*d*, and 6*f*. Reference numerals 8*a* to 8*f* designate coupling diodes, wherein 8*a*, 8*c*, and 8*e* designate first coupling diodes; and 8*b*, 8*d*, and 8*f* designate second coupling diodes. Reference numerals 9*a* to 9*f* designate groups of elements for suppressing the rate of change in current (hereinafter referred to simply as "suppression groups"), wherein 9*a*, 9*c*, and 9*e* designate first suppression groups; and 9*b*, 9*d*, and 9*f* designate second suppression groups. Reference numerals 10*a* to 10*f* designate recovery diodes for recovering the energy stored in the respective clamping capacitors 6*a* to 6*f* and the energy stored in the respective suppression groups 9*a* to 9*f*, wherein 10*a*, 10*c*, and 10*e* designate first recovery diodes; and 10*b*, 10*d*, and 10*f* designate second recovery diodes. Reference numerals 11*a* to 11*f* designate recovery capacitors, wherein 11*a*, 11*c*, and 11*e* designate first recovery capacitors and 11*b*, 11*d*, and 11*f* designate second recovery capacitors. A third serially-connected element is constituted of the first recovery diodes 10*a*, 10*c*, and 10*e* and the first recovery capacitors 11*a*, 11*c*, and 11*e*. A fourth serially-connected element is constituted of the second recovery diodes 10*b*, 10*d*, and 10*f* and the second recovery capacitors 11*b*, 11*d*, and 11*f*. Reference numeral 12*a* designates a first energy regenerative circuit which is connected to the first recovery capacitors 11*a*, 11*c*, and 11*e* and feeds the energy stored in the first recovery capacitors 11*a*, 11*c*, and 11*e* back to the d.c. voltage circuit 1*a*; particularly, a node between potential P and potential C. Reference 12*b* designates a second energy regenerative circuit which is connected to the second recovery capacitors 11*b*, 11*d*, and 11*f* and feeds the energy stored in the first recovery capacitors 11*b*, 11*d*, and 11*f* back to the d.c. voltage circuit 1*b*; particularly, a node between potential C and potential N. Symbols OUTa to OUTc designate output terminals to be connected to unillustrated respective loads.

Figure 13:
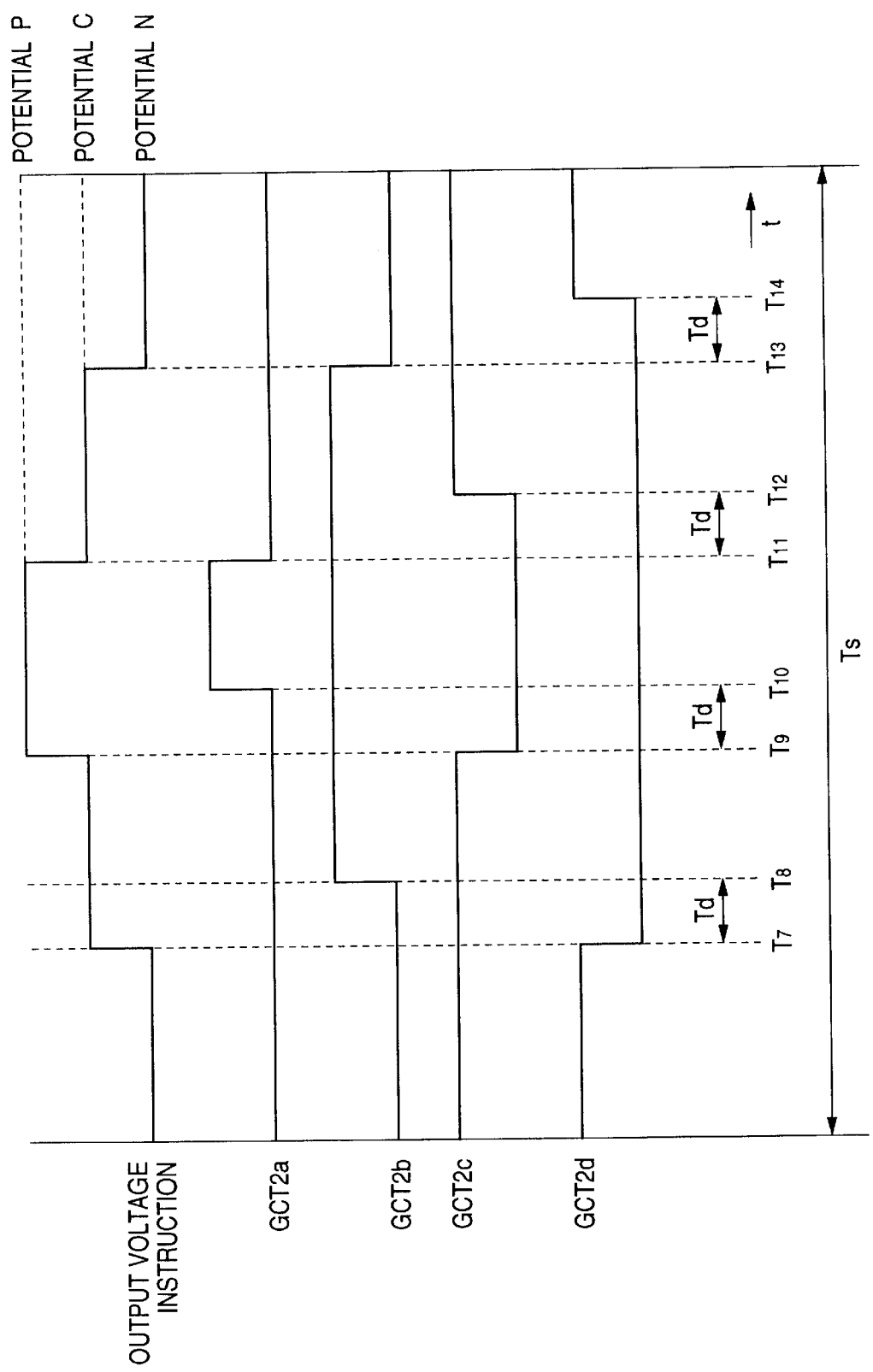
FIG. 13 is a timing chart for describing a method of switching a three-level inverter bridge shown in FIG. 12.

FIG. 13 shows a method of switching the GCTs 2*a*, 2*b*, and 2*c* constituting the three-level inverter bridge in response to an output voltage instruction. Provided that the inverter is controlled by means of PWM and the cycle of PWM is taken as $T_s$, a method schematically shown in FIG. 13 can be considered to be a method of switching the GCTs in response to an output voltage instruction. Symbol $T_d$ designates the short-circuit prevention time, which has been described with reference to FIG. 2.

The circuit operation of the inverter of the present embodiment will now be described. In principle, the relationship between the GCT 2*a* and the GCT 2*b* shown in FIG. 1 can be applied to the relationship between the GCT 2*a* and the GCT 2*c* shown in FIG. 11 or to the relationship between the GCT 2*b* and the GCT 2*d* shown in FIG. 11.

Provided that the load current is of positive polarity and flows from the output terminal OUTa to the load, the energy which is output from the coupling diode 8*a* as a result of the turn-on operation of the GCT 2*a* at $t=T_{10}$, and the energy which is formed from the energy stemming from the turn-off operation of the GCT 2*a* at $t=T_{11}$ are stored in the first suppression group 9*a*. The thus-stored energy is then recovered by the recovery capacitor 11*a*. In contrast, the energy which is formed from the reverse recovery current output from the free-wheeling diode 3*d*, as a result of turn-on operation of the GCT 2*b* at $t=T_8$, and the energy which is formed from a load current stemming from the turn-off operation of the GCT 2*b* at $t=T_{13}$ are stored in the second suppression group 9*b*. The thus-stored energy is then recovered by the recovery capacitor 11*b*.

Provided that the load current is of negative polarity and flows from the load to the output terminal OUTa, the energy which is formed from a load current stemming from the turn-off operation of the GCT 2*a* at $t=T_9$, and the energy which is formed from the reverse recovery current output from the free-wheeling diode 3*a*, as a result of the turn-on operation of the GCT 2*a* at $t=T_{12}$, are stored in the first suppression group 9*a*. The thus-stored energy is then recovered by the recovery capacitor 11*a*. In contrast, the energy which is formed from a load current stemming from the turn-on operation of the GCT 2*d* at $t=T_7$ and the energy which is formed from the reverse recovery current output from the coupling diode 8*b*, as a result of turn-on operation of the GCT 2*d* at $t=T_{14}$, are stored in the second suppression group 9*b*. The thus-stored energy is then recovered by the recovery capacitor 11*b*.

It can be seen that the number of times the energy is stored in the first suppression group 9*a* or the second suppression group 9*b* is twice that in the case of the two-level inverter bridge. As a result, the energy to be fed back to and recycled by the d.c. voltage circuits 1*a* and 1*b* is also doubled.

As can be seen from the foregoing descriptions, it goes without saying that any one of the first through ninth embodiments described in connection with the two-level inverter bridges can be applied to the three-level inverter bridge shown in FIG. 12. In such a case, there is obviously yielded an advantage equal to or greater than that yielded by the inverter of two-level inverter bridge. Accordingly, repetition of the same explanations is omitted here.

In a case where the circuit configuration of the sixth embodiment is applied to the three-level inverter bridge shown in FIG. 12, the following circuit configuration is considered. The first clamping diodes 5*a*, 5*c*, and 5*e* and the first recovery diodes 10*a*, 10*c*, and 10*e* are disposed in the manner as described with reference to FIG. 6. More specifically, the cathode surface of the clamping diode 5*a* is disposed opposite the anode surface of the recovery diode 10*a*, with the cooling fin 18 interposed therebetween. The cathode surface of the clamping diode 5*c* is disposed opposite the anode surface of the recovery diode 10*c*, with the cooling fin 18 interposed therebetween. The cathode surface of the clamping diode 5*e* is disposed opposite the anode surface of the recovery diode 10*e*, with the cooling fin 18 interposed therebetween. In contrast, the second clamping diodes 5*b*, 5*d*, and 5*f* and the second recovery diodes 10*b*, 10*d*, and 10*f* are disposed in a different way. More specifically, the anode surface of the clamping diode 5*b* is disposed opposite the cathode surface of the recovery diode 10*b*, with the cooling fin 18 interposed therebetween. The anode surface of the clamping diode 5*d* is disposed opposite the cathode surface of the recovery diode 10*d*, with the cooling fin 18 interposed therebetween. The anode surface of the clamping diode 5*f* is disposed opposite the cathode surface of the recovery diode 10*f*, with the cooling fin 18 interposed therebetween.

Eleventh Embodiment

Figure 14:
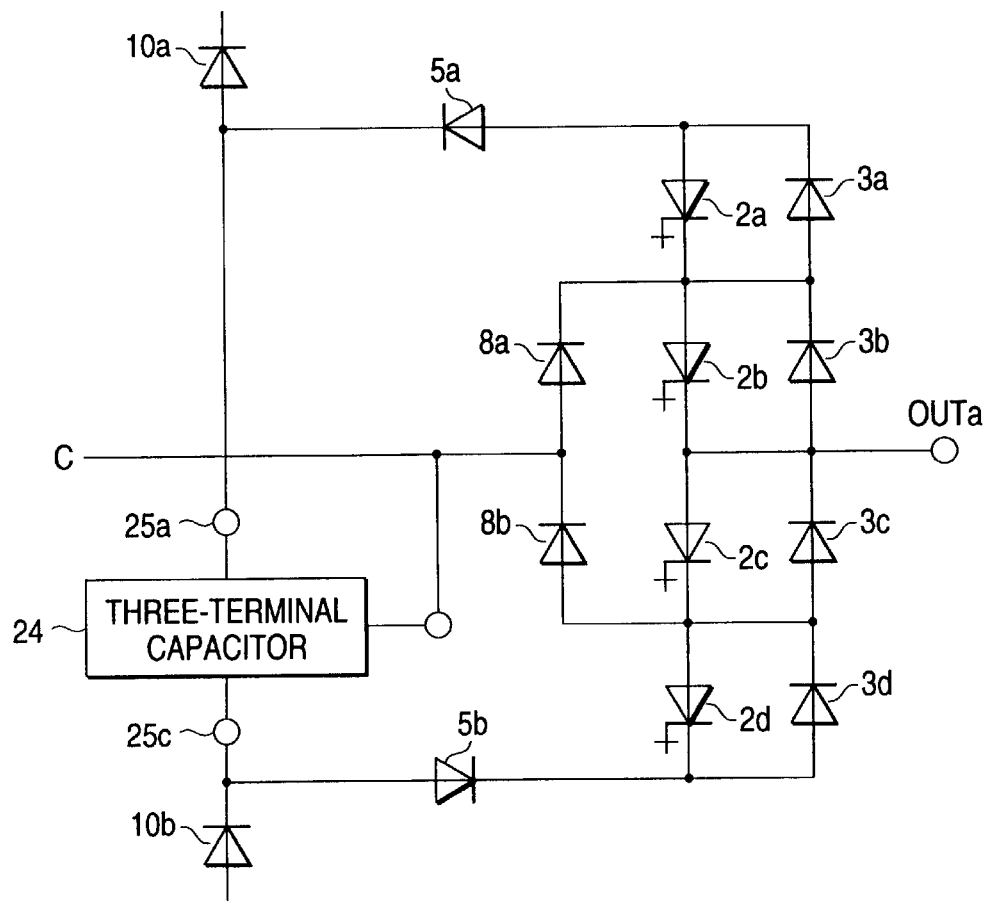
FIG. 14 is a diagram showing the circuit configuration of the principal section of an inverter according to an eleventh embodiment of the present invention.

FIG. 14 is a circuit diagram showing a portion of the three-level inverter bridge; i.e., the principal section of an inverter according to an eleventh embodiment of the present invention. In other respects, the inverter is identical with that shown in FIG. 12. As shown in FIG. 12, two-terminal capacitors are used as the first and second clamping capacitors 6*a* and 6*b* in the tenth embodiment. In the eleventh embodiment shown in FIG. 14, a three-terminal capacitor 24 is used as a clamping capacitor; specifically, the first and second clamping capacitors 6*a* and 6*b* are replaced with a single three-terminal clamping capacitor 24. A first terminal 25*a* of the three-terminal clamping capacitor 24 is connected to a serial node between the first clamping diode 5*a* and the first recovery diode 10*a*. A second terminal 25*b* of the three-terminal clamping capacitor 24 is connected to potential C of the d.c. voltage circuit 1, and a third terminal 25*c* of the three-terminal clamping capacitor 24 is connected to a serial node between the second clamping diode 5*b* and the second recovery diode 10*b*.

As a result of such a circuit configuration, the number of clamping capacitors 6*a* to 6*f* used in the three-level inverter bridge can be reduced to half, and the number of terminals of the clamping capacitor can be reduced from four to three.

Twelfth Embodiment

Although the foregoing examples employ the GCT as a self-arc-extinguishing element, the present invention can be sufficiently applied to an inverter which employs, for example, an IGBT as a self-arc-extinguishing element. The present invention is intended to provide an inverter which can achieve miniaturization, a reduction in power loss, an improvement in reliability, and a further increase in capacity. Currently, the GCT is the only self-arc-extinguishing semiconductor element which has the largest capacity and can use a clamping snubber circuit rather than a charge-and-recharge snubber circuit. Therefore, as of now, use of a GCT is most preferable.

For example, in a case where the inverter according to any one of the first through eleventh embodiments is embodied through use of an IGBT whose rated value is about one-third that of an GCT, a plurality of IGBTs connected in series-parallel must be used to embody a single GCT, thereby resulting in an increase in the number of components and posing a definitive problem of impairing the reliability of the inverter.

Accordingly, the present invention that has been described is not effective for application of an IGBT to an inverter, but can be sufficiently utilized in a case where a self-arc-extinguishing semiconductor element of silicon carbide, which is now increasingly developed and has a wide safe-operation range, is improved in capacity and is made commercially practical in place of the GCT.

As has been described above, according to the first aspect of the present invention, the energy stored in the group of elements for suppressing the rate of change in current provided in the two-level inverter bridge is fed back to and recycled by the d.c. voltage circuit, by means of the energy regenerative circuit. Accordingly, the power loss of the inverter can be diminished. Further, since a reverse voltage can be applied to the clamping diode at any time other than during a period of switching operation, there can be prevented the clamping diode from being brought into conduction, which would otherwise be caused by variations in the d.c. voltage circuit. There can be prevented breakage of the main circuit element, which would otherwise be caused by application of an excessive voltage to the clamping diodes or by faulty turn-on operations of the self-arc-extinguishing semiconductor elements, thereby improving the reliability of the inverter. Further, the inverter is free of wasteful power dissipation, which would arise in a conventional inverter, and hence the capacity of a cooling device can be diminished, to thereby render the inverter more compact. Thus, there can simultaneously be achieved an increase in the capacity of an inverter, an improvement in the reliability of the inverter, a reduction in power loss of the inverter, and miniaturization of the inverter, through use of a large-capacity self-arc-extinguishing semiconductor element.

Further, according to the second aspect of the present invention, the energy stored in the group of elements for suppressing the rate of change in current provided in the three-level inverter bridge is fed back to and recycled by the d.c. voltage circuit, by means of the energy regenerative circuit. Accordingly, the power loss of the inverter can be diminished. Further, since a reverse voltage can be applied to the clamping diode at any time other than during a period of switching operation, there can be prevented the clamping diode from being brought into conduction, which would otherwise be caused by variations in the d.c. voltage circuit. There can be prevented breakage of the main circuit element, which would otherwise be caused by application of an excessive voltage to the clamping diodes or by faulty turn-on operations of the self-arc-extinguishing semiconductor elements, thereby improving the reliability of the inverter. Further, the inverter is free of wasteful power dissipation, which would arise in a conventional inverter, and hence the capacity of a cooling device can be diminished, to thereby render the inverter more compact. Thus, there can simultaneously be achieved an increase in the capacity of an inverter, an improvement in the reliability of the inverter, a reduction in power loss of the inverter, and miniaturization of the inverter, through use of a large-capacity self-arc-extinguishing semiconductor element.

What is claimed is:

1. An inverter comprising:
   a d.c. voltage circuit with two potentials, P and N;
   "n" two-level inverter bridges (where "n" is an integer satisfying n≧1) which can selectively output the potential P or N to an output terminal connected to a load, each of the "n" two-level inverter bridges including:
   first and second self-arc-extinguishing semiconductor elements having respective anodes and cathodes and connected in series,
   first and second free-wheeling diodes connected in reverse polarity with each other and in parallel with the first and second self-arc-extinguishing semiconductor elements,
   a group of elements for suppressing current change rate connected to a junction between the potential P of the d.c. voltage circuit and the anode of the first self-arc-extinguishing semiconductor element,
   a first serially-connected element connected to a node between the anode of the first self-arc-extinguishing semiconductor element and the cathode of the second self-arc-extinguishing semiconductor element and including a clamping diode having an anode and a cathode and a clamping capacitor, and
   a second serially-connected element including a recovery diode having an anode and a cathode and a recovery capacitor for recovering energy from the clamping capacitor and from the group of elements, the cathode of the clamping diode and the anode of the recovery diode being connected to a terminal of the clamping capacitor which is not connected to the cathode of the second self-arc-extinguishing semiconductor element; and
   an energy regenerative circuit connected to the recovery capacitor and feeding energy stored in the recovery capacitor back to the d.c. voltage circuit.

2. The inverter as defined in claim 1, wherein a energy regenerative circuit controls the charging voltage applied to the recovery capacitor in proportion to current flowing from the output terminal to the load.

3. The inverter as defined in claim 1, including a plurality of two-level inverter bridges connected to a single d.c. voltage circuit, the plurality of inverter bridges being divided into a plurality of groups, and a different energy regenerative circuit connected to the inverter bridge on a per-group basis, each of the energy regenerative circuits feeding power back to the d.c. voltage circuit.

4. The inverter as defined in claim 1, wherein the energy regenerative circuit comprises a step-up transformer including a plurality of low-voltage primary windings and a single high-voltage secondary winding a plurality of two-level inverter bridges connected to a single d.c. voltage circuit, the plurality of inverter bridges being divided into a plurality of groups, and a different low-voltage primary-winding being connected to the inverter bridge on a per-group basis.

5. The inverter as defined in claim 1, wherein the group of elements comprises at least one fuse and at least one anode reactor.

6. The inverter as defined in claim 1, wherein the energy regenerative circuit is deactivated when current flowing from the output terminal to the load is zero.

7. The inverter as defined in claim 1, including a resonance suppression element connecting the plurality of recovery capacitors to the energy regenerative circuit.

8. The inverter as defined in claim 1, wherein the clamping diode and the recovery diode have flat packages of identical diameters, and a surface of the clamping diode and a surface of the recovery diode are disposed opposite each other, with a cooling fin interposed therebetween.

9. The inverter as defined in claim 1, wherein the self-arc-extinguishing semiconductor element is a gate-commutated turn-off thyristor.

10. An inverter comprising:
    a d.c. voltage circuit with three potentials P, C, and N;
    "n" three-level inverter bridges (where "n" is an integer satisfying n≧1) which can selectively output any one of the potentials P, C, and N to an output terminal connected to a load, each of the "n" three-level inverter bridges including:
    first, second, third, and fourth self-arc-extinguishing semiconductor elements having respective anodes and cathodes and connected in series,
    first, second, third, and fourth free-wheeling diodes having respective anodes and cathodes and connected in reverse polarity in parallel and in parallel with the first second, third, and fourth self-arc-extinguishing semiconductor elements,
    a first coupling diode connected to a node between the potential C of the d.c. voltage circuit and the anode of the second self-arc-extinguishing semiconductor element,
    a second coupling diode connected to a node between the cathode of the third self-arc-extinguishing semiconductor element and the potential C of the d.c. voltage circuit,
    a first group of elements for suppressing current change rate connected to a junction between the potential P of the d.c. voltage circuit and the anode of the first self-arc-extinguishing semiconductor element,
    a second group of elements for suppressing current change rate connected to a junction between the potential N of the d.c. voltage circuit and the cathode of the fourth self-arc-extinguishing semiconductor element,
    a first serially-connected element connected to a node between the anode of the first self-arc-extinguishing semiconductor element and the potential C of the d.c. voltage circuit and including a first clamping diode having an anode and a cathode and a first clamping capacitor,
    a second serially-connected element connected to a node between the potential C of the d.c. voltage circuit and the cathode of the fourth self-arc-extinguishing semiconductor element and including a second clamping capacitor and a second clamping diode having an anode and a cathode,
    a third serially-connected element including a first recovery diode having an anode and a cathode and a first recovery capacitor for recovering energy from the first clamping capacitor and from the first group of elements current change rate, and
    a fourth serially-connected element including a second recovery diode and a second recovery capacitor for recovering energy from the second clamping capacitor and from the second group of element for suppressing the current change rate, the cathode of the first clamping diode and the anode of the first recovery diode being connected to a terminal of the first clamping capacitor which is not connected to the potential C of the d.c. voltage circuit, and the anode of the second clamping diode and the cathode of the second recovery diode being connected to terminal of the second clamping capacitor which is not connected to the potential C of the d.c. voltage circuit;

a first energy regenerative circuit connected to the first recovery capacitor and feeding energy stored in the first recovery capacitor back to a node between the potential P and the potential C of the d.c. voltage circuit; and a second energy regenerative circuit connected to the second recovery capacitor and feeding energy stored in the second recovery capacitor back to a node between the potential C and the potential N of the d.c. voltage circuit.

11. The inverter as defined in claim 10, wherein the energy regenerative circuit controls a charging voltage applied to the recovery capacitor in proportion to current flowing from the output terminal to the load.

12. The inverter as defined in claim 10, including a plurality of three-level inverter bridges connected to a single d.c. voltage circuit, the plurality of inverter bridges being divided into a plurality of groups, and a different energy regenerative circuit connected to the inverter bridge on a per-group basis, each of the energy regenerative circuits feeding power back to the d.c. voltage circuit.

13. The inverter as defined in claim 10, wherein the energy regenerative circuit comprises a step-up transformer including a plurality of low-voltage primary windings and a single high-voltage secondary winding and a plurality of three-level inverter bridges connected to a single d.c. voltage circuit, the plurality of inverter bridges being divided into a plurality of groups, and a different low-voltage primary-winding being connected to the inverter bridge on a per-group basis.

14. The inverter as defined in claim 10, wherein the group of elements comprises at least one fuse and at least one anode reactor.

15. The inverter as defined in claim 10, wherein the energy regenerative circuit is deactivated when current flowing from the output terminal to the load is zero.

16. The inverter as defined in claim 10, including a resonance suppression element connecting the plurality of recovery capacitors to the energy regenerative circuit.

17. The inverter as defined in claim 10, wherein the clamping diode and the recovery diode have flat packages of identical diameters, and a surface of the clamping diode and a surface of the recovery diode are disposed opposite each other, with a cooling fin interposed therebetween.

18. The inverter as defined in claim 10, wherein the self-arc-extinguishing semiconductor element is a gate-commutated turn-off thyristor.

19. The inverter as defined in claim 10, wherein the first clamping capacitor and the second clamping capacitor are a single three-terminal clamping capacitor, with a first terminal connected to a serial connection point between the first clamping diode and the first recovery diode, a second terminal connected to the potential C of the d.c. voltage circuit, and a third terminal connected to a serial connection point between the second clamping diode and the second recovery diode.

* * * * *